United States Patent
Thompson et al.

(10) Patent No.: US 12,227,083 B2
(45) Date of Patent: Feb. 18, 2025

(54) ANNUNCIATING OR POWER VENDING CIRCUIT BREAKER FOR AN ELECTRIC LOAD

(71) Applicant: EATON INTELLIGENT POWER LIMITED, Dublin (IE)

(72) Inventors: Ronald L. Thompson, Knoxville, TN (US); Jason-David Nitzberg, Cincinnati, OH (US); David Austin Eldridge, Knoxville, TN (US); Brandon J. Rogers, Knoxville, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 6 days.

(21) Appl. No.: 18/207,872

(22) Filed: Jun. 9, 2023

(65) Prior Publication Data

US 2023/0331089 A1 Oct. 19, 2023

Related U.S. Application Data

(60) Continuation of application No. 15/983,810, filed on May 18, 2018, now Pat. No. 11,712,966, which is a (Continued)

(51) Int. Cl.
*H02H 3/00* (2006.01)
*B60L 3/00* (2019.01)
(Continued)

(52) U.S. Cl.
CPC .............. *B60L 3/00* (2013.01); *B60L 3/0069* (2013.01); *B60L 3/04* (2013.01); *B60L 53/18* (2019.02); *B60L 53/305* (2019.02); *B60L 53/51* (2019.02); *B60L 53/665* (2019.02); *B60L 53/68* (2019.02); *H01H 9/548* (2013.01); *H01H 83/02* (2013.01); *H02H 1/0061* (2013.01);
(Continued)

(58) Field of Classification Search
CPC .. B60L 3/00; B60L 3/04; B60L 3/0069; B60L 53/665; B60L 53/18; B60L 53/51; H01H 9/548; H01H 83/02; H02H 1/0061; H02H 3/006; H02H 3/33
USPC .......................................................... 361/42
See application file for complete search history.

(56) References Cited

U.S. PATENT DOCUMENTS 6,734,380 B2 * 5/2004 Gerard .................. H01H 71/08
200/51 R

* cited by examiner

*Primary Examiner* — Jared Fureman
*Assistant Examiner* — Lucy M Thomas
(74) *Attorney, Agent, or Firm* — Eckert Seamans Cherin & Mellott, LLC

(57) ABSTRACT

A circuit breaker for an electric load includes first and second terminals; a number of first separable contacts each electrically connected between one of the first terminals and one of the second terminals; a first mechanism to open, close or trip open the first contacts; a number of second separable contacts each electrically connected in series with a corresponding one of the first contacts; a second mechanism to open or close the second contacts; a processor to cause the second mechanism to open or close the second contacts, annunciate through one of the second terminals a power circuit electrical parameter for the electric load, receive from a number of the second terminals a confirmation from or on behalf of the electric load to cause the second mechanism to close the second contacts, and determine a fault state operatively associated with current flowing through the second contacts.

15 Claims, 22 Drawing Sheets

Related U.S. Application Data division of application No. 13/753,793, filed on Jan. 30, 2013, now abandoned.

(51) Int. Cl.
| | |
|---|---|
| *B60L 3/04* | (2006.01) |
| *B60L 53/18* | (2019.01) |
| *B60L 53/30* | (2019.01) |
| *B60L 53/51* | (2019.01) |
| *B60L 53/66* | (2019.01) |
| *B60L 53/68* | (2019.01) |
| *H01H 9/54* | (2006.01) |
| *H01H 83/02* | (2006.01) |
| *H02H 1/00* | (2006.01) |
| *H02H 3/33* | (2006.01) |
| *H02H 9/08* | (2006.01) |
| *H02J 3/00* | (2006.01) |
| *H02J 13/00* | (2006.01) |

(52) U.S. Cl.
CPC .............. *H02H 3/006* (2013.01); *H02H 3/33* (2013.01); *H02J 3/008* (2013.01); *H02J 13/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/12* (2013.01); *Y04S 30/14* (2013.01)

ANNUNCIATING OR POWER VENDING CIRCUIT BREAKER FOR AN ELECTRIC LOAD

CROSS-REFERENCE TO RELATED APPLICATIONS

This application is a continuation of, and claims priority under 35 U.S.C. § 120 from, U.S. patent application Ser. No. 15/983,810, filed May 18, 2018, which application is a divisional of, and claims priority from, U.S. patent application Ser. No. 13/753,793, filed Jan. 30, 2013, entitled "ANNUNCIATING OR POWER VENDING CIRCUIT BREAKER FOR AN ELECTRIC LOAD", the contents of which are incorporated herein by reference.

This application is related to commonly assigned, copending U.S. patent application Ser. No. 13/753,802, filed Jan. 30, 2013, entitled "ELECTRIC POWER DISTRIBUTION SYSTEM INCLUDING METERING FUNCTION AND METHOD OF EVALUATING ENERGY METERING", now U.S. Pat. No. 10,067,199, issued Sep. 4, 2018.

BACKGROUND

Field

The disclosed concept pertains generally to electrical switching apparatus and, more particularly, to circuit breakers.

Background Information

Circuit breakers used in residential and light commercial applications are commonly referred to as miniature circuit breakers because of their limited size. Such circuit breakers typically have a pair of separable contacts opened and closed by a spring biased operating mechanism. A thermal-magnetic trip device actuates the operating mechanism to open the separable contacts in response to a persistent overcurrent condition or a short circuit.

In some applications, it has been found convenient to use circuit breakers for other purposes than just protection, for instance, for load shedding. It is desirable to be able to perform this function remotely, and even automatically, such as under the control of a computer. However, the spring biased operating mechanisms are designed for manual reclosure and are not easily adapted for reclosing remotely. In any event, such operating mechanisms are not designed for repeated operation over an extended period of time.

Remotely controllable circuit breakers or remotely operated circuit breakers introduce a second pair of separable contacts in series with the main separable contacts. See, for example, U.S. Pat. Nos. 5,301,083; 5,373,411; 6,477,022; and 6,507,255. The main contacts still interrupt the overcurrent, while the secondary contacts perform discretionary switching operations. For example, the secondary contacts are controlled by a solenoid, which is spring biased to close the contacts, or by a latching solenoid.

Conventional ground fault circuit breakers provide ground fault detection and thermal-magnetic overload sections that are coupled with a single circuit breaker operating handle to indicate on, tripped and off states, and to control opening and closing of the power circuit.

An electric vehicle (EV) charging station, also called an EV charging station, electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands.

An EV charging station is a device that safely allows electricity to flow. These charging stations and the protocols established to create them are known as EVSE, and they enhance safety by enabling two-way communication between the charging station and the EV.

The 1996 NEC Article 625 defines EVSE as being the conductors, including the ungrounded, grounded, and equipment grounding conductors, the EV connectors, attachment plugs, and all other fittings, devices, power outlets or apparatus installed specifically for the purpose of delivering energy from premises wiring to an EV.

EVSE is defined by the Society of Automotive Engineers (SAE) recommended practice J1772™ and the National Fire Protection Association (NFPA) National Electric Code (NEC) Article 625. While the NEC defines several safety requirements, J1772™ defines the physical conductive connection type, five pin functions (i.e., two power pins (Hot1 and Hot2 or neutral; or Line 1 and Line 2), one ground pin, one control pilot pin, and one proximity pin), the EVSE to EV handshake over the pilot pin, and how both parts (EVSE and EV) are supposed to function.

Two-way communication seeks to ensure that the current passed to the EV is both below the limits of the EV charging station itself, below the limits of the cordset connecting the EV charging station to the EV, and below the tripping limit of upstream protection devices, such as circuit breakers. The EV is the load and the load dictates how much power is being pulled. The EV knows its own limits and since it sets the amount of current being pulled, communication is not required in order to protect the EV. Instead, communication is employed to protect all of the distribution equipment delivering power to the EV.

There are additional safety features, such as a load interlock, that does not allow current to flow from the EV charging station until the EV connector or EV plug is physically inserted into the EV and the EV is ready to accept energy. Once the EV signals that it is finished accepting energy or the EV is unplugged, the load interlock continues to prevent current flow.

SAE J1772™ in the United States and the IEC 61851 standard in the rest of the world or where applicable use a very simple but effective pilot circuit and handshake in the EVSE. For charging a vehicle using alternating current (AC), basically a signal is generated on the pilot pin, starting at a constant +12 Vdc open circuit when measured to the ground pin. When the EVSE cable and connector is plugged into an EV inlet of a compliant vehicle, the vehicle's circuit has a resistor and a diode in series that ties to ground in order to drop the +12 Vdc to +9 Vdc. After the EVSE sees this drop in voltage, it turns on a pulse-width modulated (PWM) generator that defines the maximum available line current (ALC) on the charging circuit. This generated PWM signal oscillates between +12 Vdc and −12 Vdc when measured at its source. The vehicle charge controller reads the percentage of the duty cycle of the PWM signal, which is equivalent to a set amperage, and sets the maximum current draw on the onboard vehicle rectifier/charger, in order to not trip an upstream circuit interrupter, such as a circuit breaker. The vehicle, in turn, adds another resistor in parallel with the resistor of the vehicle's resistor and diode series combination, which then drops the top level of the PWM pilot signal to +6 Vdc while leaving the bottom level at −12 Vdc. This tells the EVSE that the vehicle is ready to charge and that it is actually a vehicle and not simply a resistance such as a person's finger which caused the voltage drop. In response, the EVSE closes an internal relay/contactor to allow AC power to flow to the vehicle.

Known EV charging stations consist generally of a completely separate device from a load center, panelboard, or normal upstream protection. Such EV charging stations are a special box with indicators for power and state along with a connected EV cable/connector for the intended purpose of charging the EV. These EV charging stations require an upstream circuit breaker, and a completely separate, special enclosure and an EV cable/connector.

Electric utilities desire to separately meter and bill power going to an EV or other electric loads deemed applicable by the utility or other authority. Known methods require a separately derived metering system, which is relatively expensive and complex to install and manage. This prohibits technology adoption and implementation. There is room for improvement in sub-metering, billing against, and managing electric loads deemed "special" or otherwise applicable by electric utilities or other authorities.

There is room for improvement in circuit breakers and EV charging stations.

SUMMARY

These needs and others are met by various embodiments of the disclosed concept in which a circuit breaker processor annunciates a power circuit electrical parameter for an electric load (e.g., without limitation, an electric vehicle), receives a confirmation from or on behalf of the electric load to cause a mechanism to close the separable contacts, and determines a fault state operatively associated with current flowing through the separable contacts.

In accordance with one aspect of the disclosed concept, a circuit breaker for an electric load comprises a plurality of first terminals; a plurality of second terminals; a number of first separable contacts each of which is electrically connected between one of the first terminals and one of the second terminals; a first mechanism structured to open, close or trip open the number of first separable contacts; a number of second separable contacts each of which is electrically connected in series with a corresponding one of the number of first separable contacts and electrically connected between one of the first terminals and one of the second terminals; a second mechanism structured to open or close the number of second separable contacts; a processor structured to cause the second mechanism to open or close the number of second separable contacts, annunciate through one of the second terminals a power circuit electrical parameter for the electric load, receive from a number of the second terminals a confirmation from or on behalf of the electric load to cause the second mechanism to close the number of second separable contacts, and determine a fault state operatively associated with current flowing through the number of second separable contacts.

As another aspect of the disclosed concept, a power vending circuit breaker for an electric load comprises: a plurality of first terminals; a plurality of second terminals; a number of separable contacts, at least one of the number of separable contacts being electrically connected between one of the first terminals and one of the second terminals; a thermal-magnetic protection circuit electrically connected in series with the at least one of the number of separable contacts between the one of the first terminals and the one of the second terminals; a metering circuit within the power vending circuit breaker and operatively associated with power flowing through the number of separable contacts between the one of the first terminals and the one of the second terminals; a mechanism structured to open or close the number of separable contacts; a processor within the power vending circuit breaker and structured to cause the mechanism to open or close the number of separable contacts, to input a plurality of power values from the metering circuit and to determine a plurality of energy values; and a communication mechanism cooperating with the processor to communicate the energy values to a remote location.

As another aspect of the disclosed concept, a circuit breaker for an electric load comprises: a plurality of first terminals; a plurality of second terminals; a number of separable contacts each of which is electrically connected between one of the first terminals and one of the second terminals; a mechanism structured to open or close the number of separable contacts; and a processor structured to cause the mechanism to open or close the number of separable contacts, annunciate through one of the second terminals a power circuit electrical parameter for the electric load, receive from a number of the second terminals a confirmation from or on behalf of the electric load to cause the mechanism to close the number of separable contacts, and determine a fault state operatively associated with current flowing through the number of separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; control electronics; a logic circuit; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with circuit breakers having one, two or three poles for electric loads, although the disclosed concept is applicable to a wide range of circuit breakers having any suitable number of poles for a wide range of electric loads (e.g., without limitation, electric vehicles).

Figure 1:
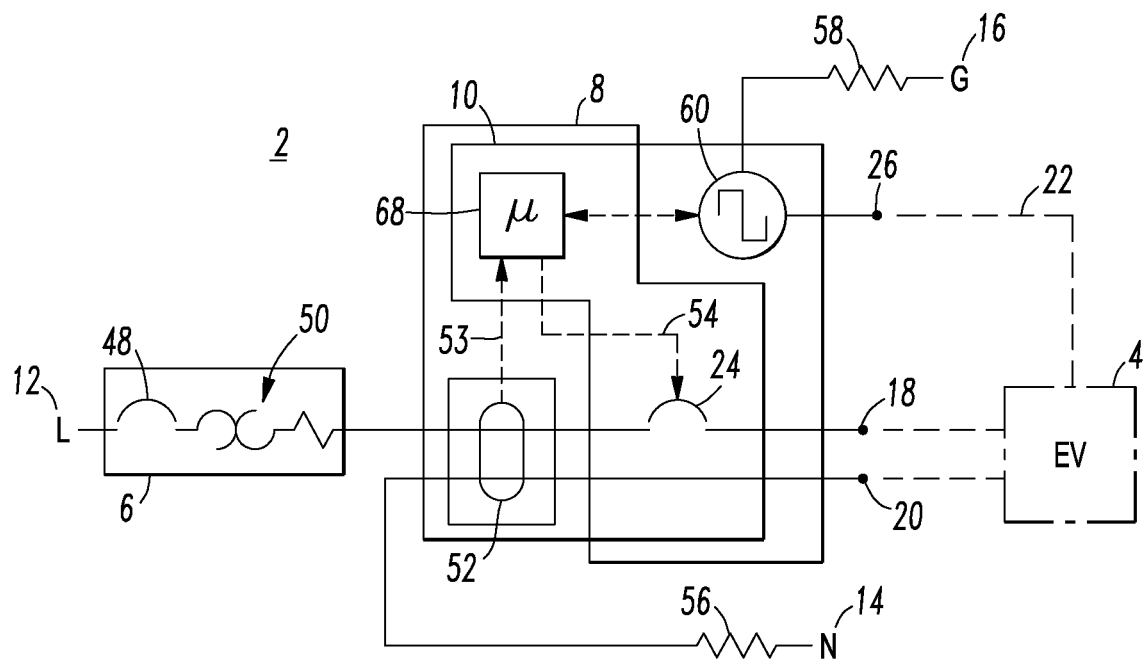
FIG. 1 is a block diagram of an electric vehicle (EV) circuit breaker in accordance with embodiments of the disclosed concept.

Referring to FIG. 1, a load annunciating circuit breaker 2 is shown. The circuit breaker 2, which can be used in connection with an electric vehicle (EV) 4 (shown in phantom line drawing), includes: a thermal-magnetic overload circuit breaking function 6, a charging circuit interrupting device (CCID) function 8, and a load annunciation function, such as the example EV interlock function 10. The circuit breaker 2 includes input terminals for line (L) 12, neutral (N) 14 and ground (G) 16 and output terminals for the load (e.g., hot/line) 18 and load neutral (e.g., neutral) 20.

Example 1

The circuit breaker 2 can, for example and without limitation, charge the example EV 4 using SAE J1772™, but can also provide a controllable point to provide more general power vending capabilities as will be discussed in connection with FIGS. 11-13. The circuit breaker 2 can be controlled by onboard, add-on, or remote software conditionals (see Example 28), rather than simply employing an open/close signal such as with a conventional remotely controllable circuit breaker.

Example 2

The example circuit breaker 2 can employ any suitable form factor (e.g., without limitation, a miniature circuit breaker; a molded case circuit breaker; any other suitable circuit interrupter form factor). In this example, the circuit breaker 2 is a single-pole circuit breaker. In territories where IEC is required, a single-pole circuit breaker may be employed (e.g., in a DIN rail mountable form factor).

Example 3

Although the circuit breaker 2 could be constructed with only one circuit breaking element per conductor as will be discussed in connection with FIG. 22, the example thermal-magnetic overload circuit breaking function 6 is separated from the CCID function 8, which provides personnel protection for EVSE applications.

For example, for the EV 4, the CCID function 8 continuously monitors the differential current from a ground fault sensor (e.g., current transformer (CT) 52) among all of the current-carrying conductors in a grounded system and rapidly interrupts the circuit under conditions where the differential current exceeds the rated value (e.g., without limitation, 5 mA; 20 mA) of the charging circuit interrupting device. The CCID function 8 may include any suitable combination of basic insulation, double insulation, grounding monitors, insulation monitors with interrupters, isolation monitoring (depending on whether it is grounded or not) and/or leakage current monitors. Alternatively, for non-EV load applications, a GFCI function can be provided with either personnel protection or equipment protection.

Example 4

The example EV interlock function 10: (1) controls the CCID function 8; (2) generates and monitors the example pilot signal 22 (FIG. 4A), which serves as the annunciator to the load (e.g., without limitation, the example pilot signal 22 annunciates a certain amount of permitted current flow to the EV 4 and receives confirmation from or on behalf of (e.g., an agent acting on behalf of (e.g., an independent supervisory control system) the EV 4) the EV 4 of its current state back to the circuit breaker 2' (FIGS. 4A-4B)); (3) creates an "interlock" based on the pilot signal 22 "handshake" state between the circuit breaker 2 and the compatible downstream EV 4 (e.g., the separable contacts 24 of the CCID function 8 do not close and provide power to the EV 4 until the proper state is achieved, and open to stop power flow if a fault occurs); (4) receives signals from the CCID function 8 on whether it is detecting a fault condition; and (5) inputs (e.g., a wire termination point 26 of an EVSE connector 28 (FIG. 4B) for the pilot signal 22 to annunciate the state to the EV 4 and receive the state from the EV 4.

Alternatively, rather than annunciating a maximum value of current permitted (e.g., available line current (ALC)) to flow through the separable contacts 24 to the electric load (e.g., the EV 4), this can annunciate a maximum and/or minimum value of voltage permitted to be applied through the separable contacts 24 to the electric load, a direction (i.e., forward or reverse) of power flow through the separable contacts 24 to or from the electric load, a minimum power factor permitted for the electric load, and a minimum conversion efficiency permitted by the electric load.

Example 5

Figure 10:
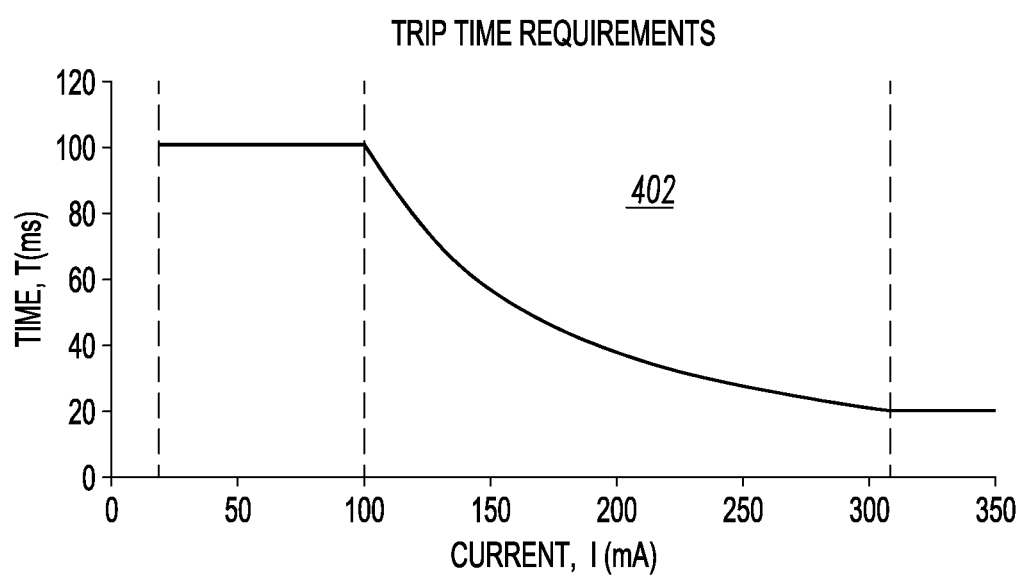
FIG. 10 is a plot of ground fault tripping time versus current for the EV circuit breaker of FIGS. 4A-4B.

The example EV interlock function 10 can provide one or more of the following optional functions: (1) other metering, allocation, authentication, communication and/or additional protective functionality may be employed in or with the circuit breaker 2 (see, for example, Examples 20-24); (2) another wire termination point 30 is employed by the EVSE connector 28 (FIG. 4B) and vehicle inlet 32 to announce its proximity and successful locking into a receptacle (e.g., 28 of FIG. 4B); (3) additional logic to handle proximity as used in the IEC standard to further restrict when the interlock is allowed to close and the amount of current allowed by the circuit breaker 2 (e.g., cable proximity wire sensing is shown in connection with FIG. 7); (4) resetting (i.e., reclosing) automatically after a predetermined time on a detected fault, specifically a ground fault or pilot error (e.g., automatic reclosure is shown in connection with FIGS. 6); and (5) varying the ground fault tripping time based on current and the amount of time within the handshake state (e.g., as shown in connection with FIGS. 8 and 10, the circuit breaker 2 does not trip immediately on closure if it ground faults immediately due to the possibility of ground leakage (e.g., arising from inrush current, charging capacitors or inductors); the circuit breaker 2 may allow some ground leakage current and vary its trip time while staying below the plot of current versus time; for a fault condition of 20 mA to 100 mA, the response time is less than or equal to 100 mS, for a fault condition of 100 mA to 308 mA, the response time (T) is less than or equal to $(20/T)^{1.43}$ mS, and for a fault condition of greater than 308 mA, the response time is less than or equal to 20 mS).

Example 6

The optional SAE J1772™ pilot signal specification for the pilot signal 22 is one example way to achieve the annunciator/interlock functions. A generator/monitor or other suitable communications path (e.g., without limitation, an optional power line carrier (PLC)), can be employed to form a similar, but different, encoding of information to: (a) communicate available line current (of the power circuit) as determined by the rating of the components or a controller; (b) communicate readiness/state/condition (of the circuit breaker 2 or EV 4); (c) communicate protective functions (of the circuit breaker 2 or EV 4); and/or (d) communicate load characteristics back to the circuit breaker 2 (or EV 4). The communication can provide, for example and without limitation, a power vending (e.g., power metering, delivery, control, and management) capability (Examples 20-24) with annunciation and interlocking from a circuit breaker, such as 2, to a load, such as the EV 4. This replaces the pilot signal 22 with digital communications over a power line, device to device.

Example 7

For example, for the interlock of the third option of Example 4, the interlock does not close the protected power circuit until a resistor value is read. The resistor's value represents different current ratings predefined in a corresponding industry standard. As a more specific example, the IEC method for charging EVs has a detachable cable with EV connectors on both sides. Each EV connector has a resistor tied from proximity (e.g., 36 of FIG. 4B) to ground that matches the rated current carrying capability of the cable. For example, if a 12 A cable was connected to a 16 A EVSE, and then connected to an EV capable of pulling 30 A, the EVSE lowers its PWM duty cycle from corresponding to the usual 16 A to correspond to 12 A, which is then transmitted to the EV, which thereby causes the EV to only pull a maximum of 12 A. This ensures that the system takes the lowest rating of all components to ensure safety and keep the equipment within its rated limits.

Example 8

Figure 4A:
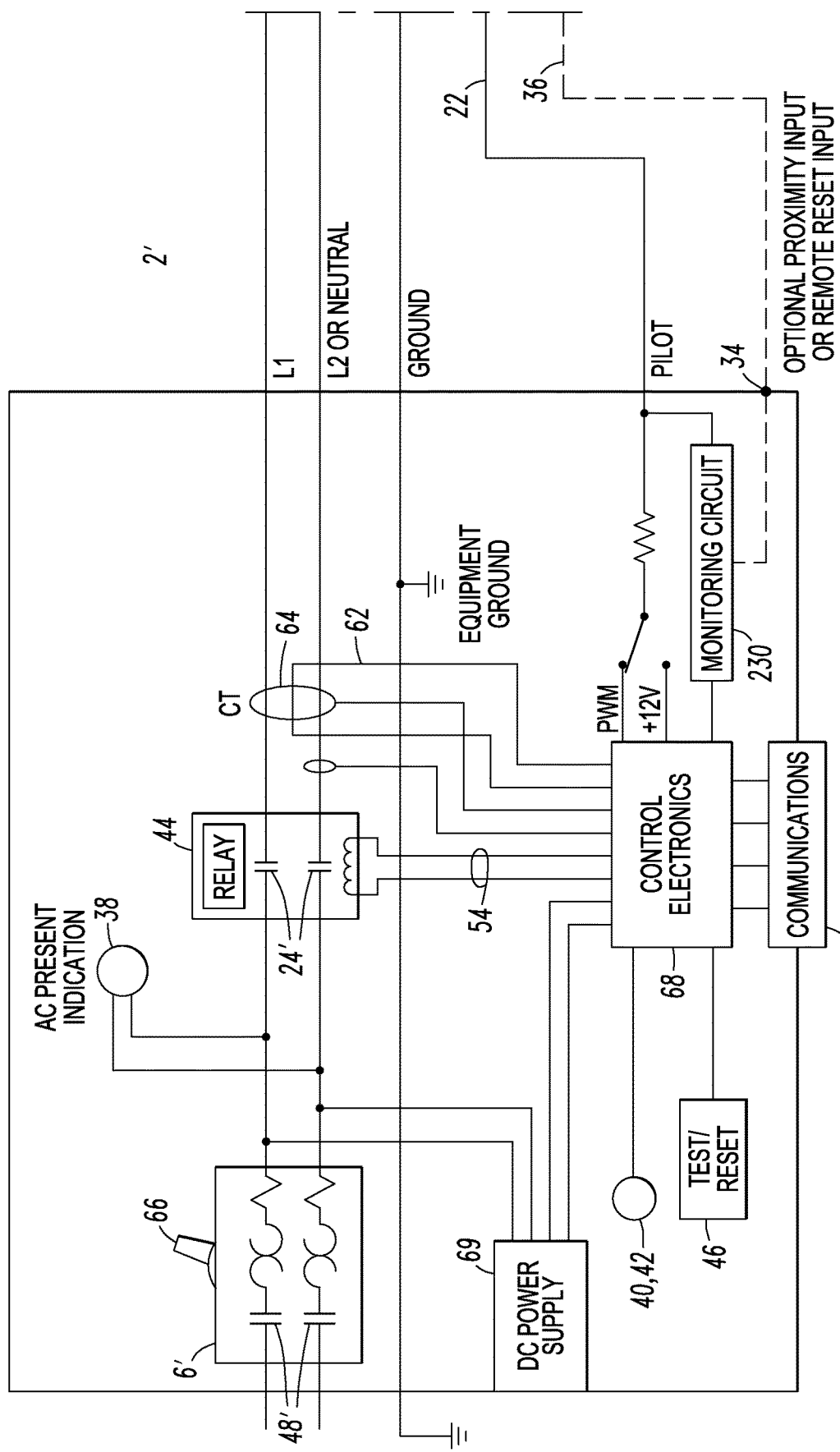
FIGS. 4A-4B form a block diagram of an EV circuit breaker, EVSE connector, and EV in accordance with another embodiment of the disclosed concept.
Figure 4B:
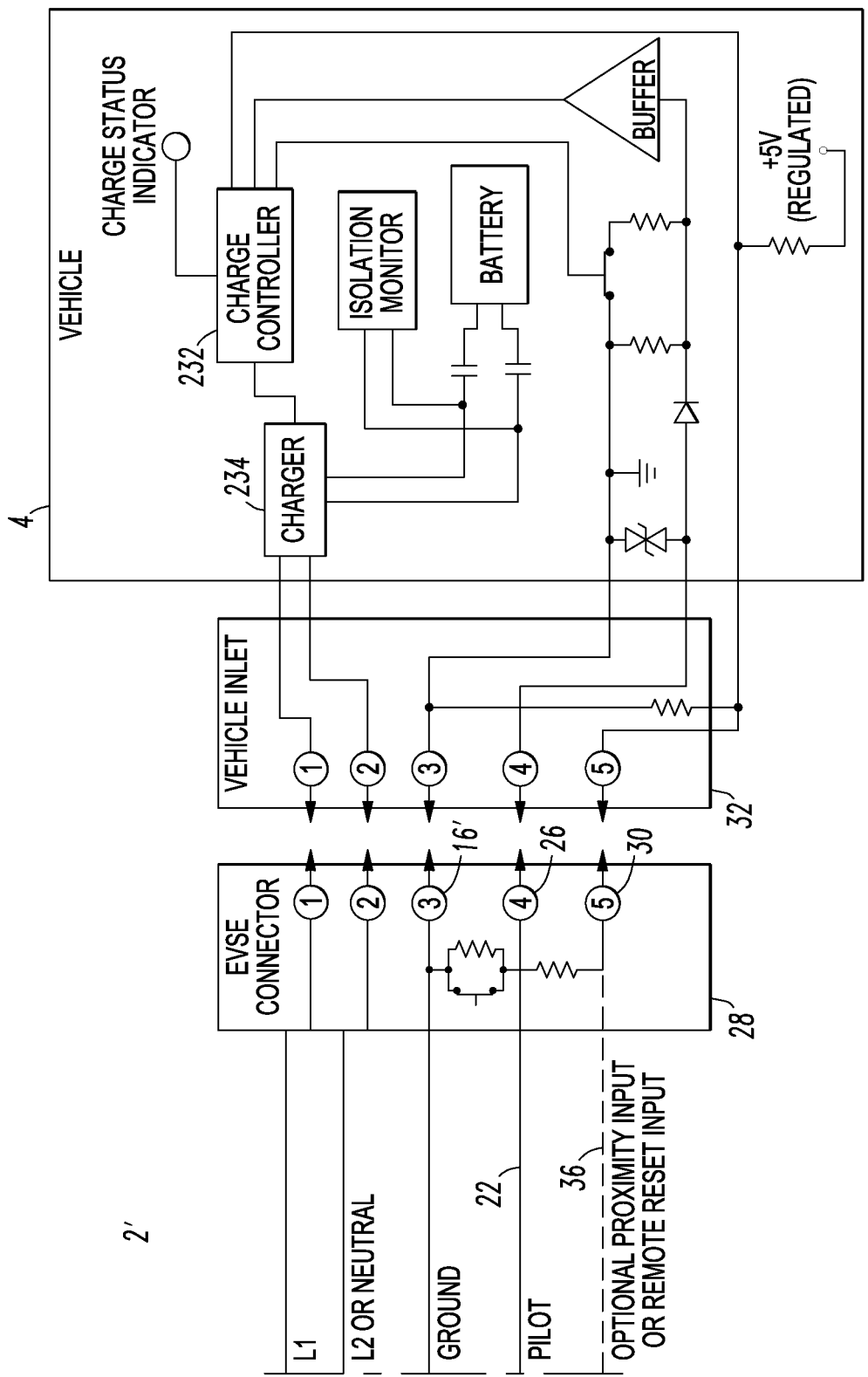

For example, for the second option of Example 4, the circuit breaker 2 includes a termination point 34 (FIG. 4A) for the proximity circuit conductor 36 from the EVSE connector 28 (FIG. 4B). For example, this can monitor the pressing of a release latch, or this same proximity circuit can also be overridden as a method for input—specifically used for resetting a fault by monitoring the proximity circuit value in conjunction with the pilot circuit. Using the knowledge that the EV cable is still connected by the state of the pilot signal 22, if the proximity circuit goes open circuit, then that can be interpreted as being a reset command without any additional conductors or communication. Alternatively, the conductor 36 can be electrically connected to a remote reset button (not shown).

By employing an EV connector latch button as a reset by monitoring the proximity conductor 36, the circuit breaker 2 can be programmed, in order that when a button is pressed, the proximity circuit is opened and the circuit breaker 2 performs the same function as if a local test/reset button 46 (FIG. 4A) has been pressed.

Example 9

The circuit breaker 2 can include a local indication of state through a suitable indicator (e.g., without limitation, indication light; LED; color; flag). Example states include ready, charging, and trouble. As shown in FIG. 4A, the ready indicator 38 (e.g., AC present) is on anytime the circuit breaker separable contacts 48' are closed and can supply power. The charging indicator 40 is an interlock indicator and is on anytime the contacts 24' of contactor/relay 44 are closed and power is available at the EVSE connector 28 (FIG. 4B). The trouble indicator 42 is illuminated anytime the circuit breaker 2' has entered a fault state. Additionally, different blink patterns may be employed to provide additional user interface feedback. For example, the trouble indicator 42 could have a certain blink pattern to tell what exact fault occurred.

Example 10

The circuit breaker 2' of FIGS. 4A-4B can include a local input 46 to test and reset (e.g., without limitation, a button on the circuit breaker 2'). As will be described in connection with FIG. 5, a test leaks a relatively small, known current to ground and verifies that a ground fault detection circuit is properly working. The test is only done while the power circuit is open. The test is generally done right before the contactor/relay 44 is closed and should be open throughout the test. If the test fails, then it prevents the contactor/relay 44 from closing. This test is only done to ensure that the circuit breaker 2' can still detect a ground fault in a safe to the user situation. If the power circuit is closed, then the circuit breaker 2' is still monitoring for ground fault but never injecting current. For a manual test (by pressing the button), the power circuit is opened, the test is performed, and then normal operation is resumed if the test passes. Regardless of the test passing or failing, the contactor/relay 44 should be open on its completion. If the test fails, then the circuit breaker 2' remains open and enters a service state where the relay 44 cannot be reset by pressing the test/reset button 46 again. The button 46 will always perform its "test" functionality unless the EV 4 is connected and the contactor/relay 44 is open from an actual fault or a previous test. In this case, the "reset" functionality will be performed and the contactor/relay 44 will be closed.

Example 11

The thermal-magnetic overload circuit breaking function 6 of FIG. 1 includes first separable contacts 48 and a thermal and magnetic overload protection mechanism 50. The CCID function 8 includes the second separable contacts 24, the CT 52 and a processor (e.g., μC or control electronics 68), preferably with customizable trip settings, which receives the differential current signal 53 from CT 52 and controls the second separable contacts 24 with a control signal 54. The μC or control electronics 68 is used by both of the CCID function 8 and the example EV interlock function 10. The neutral (N) 14 is input by a neutral pigtail 56. The example EV interlock function 10 inputs the ground (G) 16 by a ground pigtail 58, and includes pulse width modulation (PWM) generation and sensing logic 60 and the termination point 26 for the pilot signal 22.

Example 12

Figure 2:
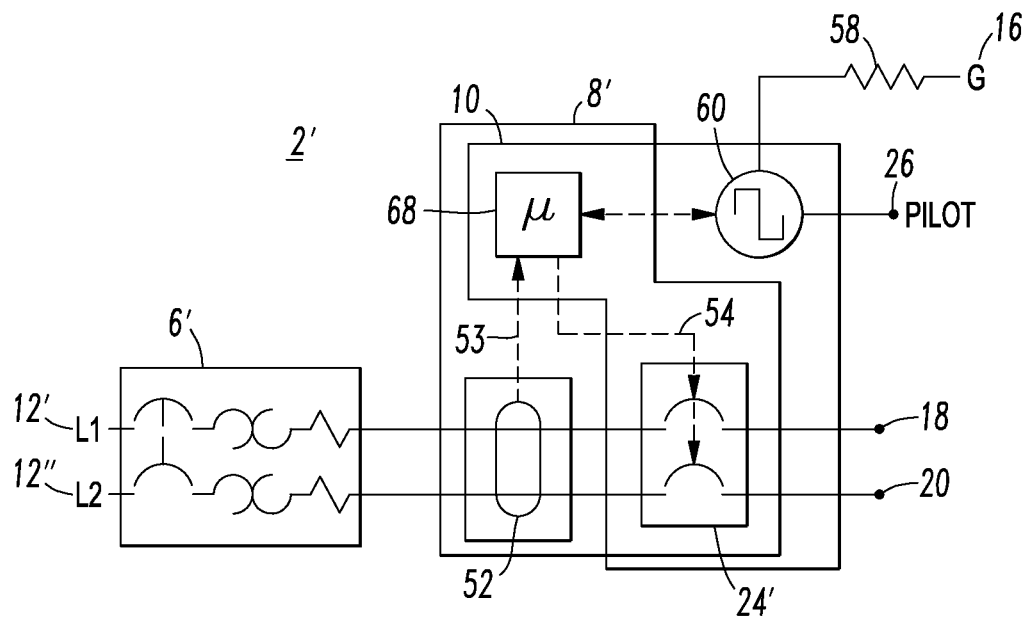
FIG. 2 is a block diagram of a single-phase, two-line, double-pole EV circuit breaker in accordance with another embodiment of the disclosed concept.

FIGS. 2 and 4A-4B show the single-phase, two-line, double-pole circuit breaker 2', which can be used in connection with the EV 4. The circuit breaker 2' includes a double-pole thermal-magnetic overload circuit breaking function 6', a double-pole CCID function 8', and the example EV interlock function 10. The circuit breaker 2' further includes inputs for two lines L1 12' and L2 12", and ground (G) 16, and output terminations for the load (e.g., hot/line 1 18 and hot/line 2 20). In this example, a neutral is not employed. Control electronics 68 are powered by an alternating current to direct current power supply 69 (FIG. 4A).

For the double-pole thermal-magnetic overload circuit breaking function 6', thermal-magnetic devices are employed on any hot or ungrounded conductors coming into the circuit breaker 2'. In contrast, for the single-pole circuit breaker 2 of FIG. 1 with line (L) 12 and neutral (N) 14 terminations, the single thermal-magnetic device 50 is employed. For example, for the overcurrent thermal-magnetic device, this is rated 125% of the maximum continuous load, or whatever is required by local codes and standards, the circuit breaker 2 will supply (e.g., without limitation, a 40 A circuit breaker for a 32 A EVSE).

The double-pole CCID function 8' of FIG. 2 can employ a double-pole relay 44 as shown in FIG. 4A. The relay 44 can be a digitally controlled circuit breaking rated relay or contactor. The double-pole relay 44 is employed on any hot or ungrounded conductors coming into the circuit breaker 2'. In contrast, for the single-pole circuit breaker 2 of FIG. 1 with line (L) 12 and neutral (N) 14 terminations, a single-pole relay is employed. Otherwise, the circuit breaker 2' is generally similar to the circuit breaker 2 of FIG. 1.

Example 13

Figure 3:
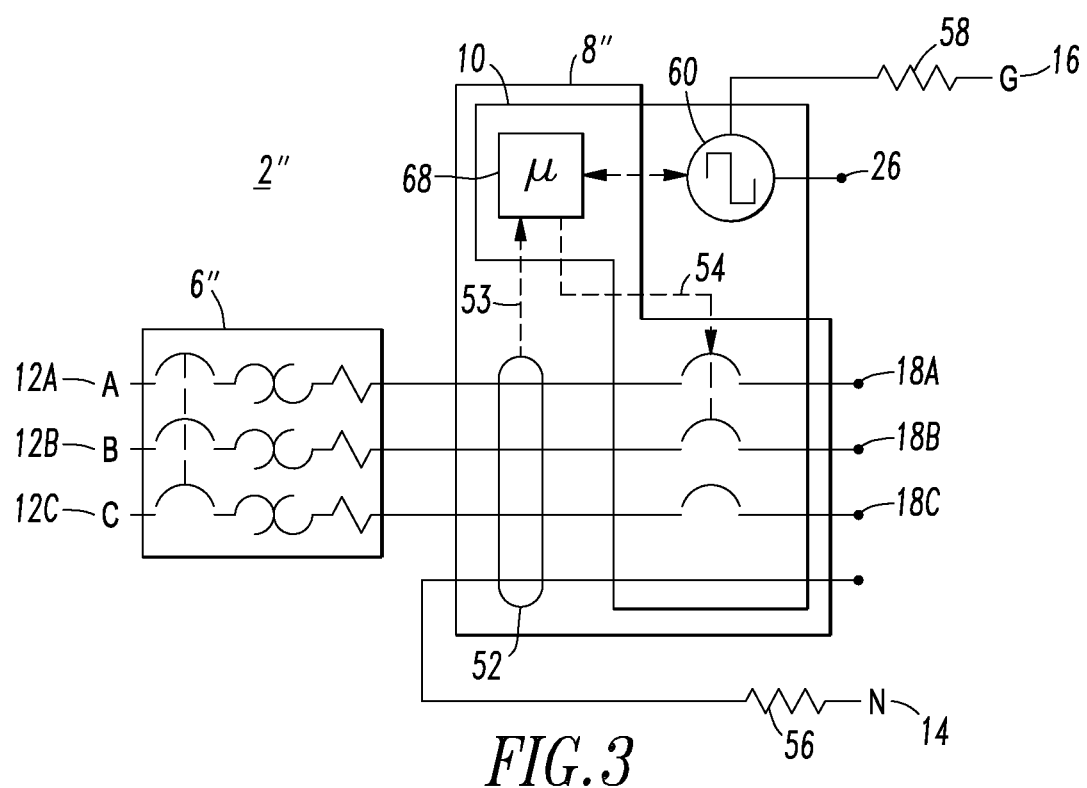
FIG. 3 is a block diagram of a three-phase, three-pole EV circuit breaker in accordance with another embodiment of the disclosed concept.

FIG. 3 shows a three-phase, three-pole circuit breaker 2", which can be used in connection with a suitable EV (not shown). The circuit breaker 2" includes a three-pole thermal-magnetic overload circuit breaking function 6", a three-pole CCID function 8", and the example EV interlock function 10. The circuit breaker 2" further includes inputs for three phases A 12A, B 12B and C 12C, ground (G) 16 and neutral (N) 14, and output terminations 18A,18B,18C for the three-phase load. Otherwise, the circuit breaker 2" is generally similar to the circuit breaker 2 of FIG. 1.

Example 14

FIGS. 4A-4B show a more detailed version of the circuit breaker 2' of FIG. 2 including the EVSE connector 28 having a ground pin 16', a pilot pin 26 and a proximity pin 30, and the EV 4. As is conventional, a conductor 62 passes through current transformer 64 and mimics leakage of ground current in connection with the performance of ground fault self-check tests. The test/reset button 46 effectively functions as a test/clear temporary fault button, with possible support for clearing a lockout or rebooting by being actuated for a predetermined period of time.

The circuit breaker 2' can support the following example fault categories: (1) circuit breaker trip; (2) permanent fault; (3) lockout fault; and (4) temporary fault. Each example fault also has a corresponding reset: (1) reset the physical circuit breaker operating handle 66; (2) reboot the software of the control electronics 68; (3) clear a lockout fault; and (4) clear a temporary fault.

Resetting the circuit breaker operating handle 66 reboots the software, clears a lockout, and clears a temporary fault. Rebooting the software clears a lockout, and clears a temporary fault. Clearing a lockout also clears a temporary fault. Unplugging the load (e.g., the EV 4) also clears a lockout and clears a temporary fault.

The thermal-magnetic overload circuit breaking function 6' faults in a conventional manner by tripping open the two example separable contacts 48' and the circuit breaker operating handle 66 in response to a short circuit or other overload current condition.

The relay 44 can trip for any of the following reasons (additionally, for example and without limitation, it can detect arc faults) in Table 1:

TABLE 1

| Fault No. | Fault | Fault Category |
|---|---|---|
| 0 | "No Fault" | No fault since last boot |
| 1 | "Pilot Error During Idle" | Temporary |
| 2 | "Pilot Error During Run" | Temporary |
| 3 | "Ground Fault Detected" | Temporary |
| 4 | "Overcurrent Detected" | Temporary |
| 5 | "Break Away Occurred" | Permanent |
| 6 | "Temporary Fault Lockout Occurred (Reset with Plug Session Cycle)" | Lockout Fault |
| 7 | "Ground Impedance Fault" | Permanent |
| 8 | "Contactor Fault" | Permanent |
| 9 | "Ground Fault Test Failure" | Permanent or Temporary, depending if the load is connected (actual ground fault compared to a self-check test failure) |
| 10 | "Diode Fault" | Temporary |

TABLE 1-continued

| Fault No. | Fault | Fault Category |
|---|---|---|
| 11 | "Master Fault Count Exceeded (Reset Required)" | Permanent, this fault count lasts across Plug Sessions within a predetermined time period |
| 12 | "Firmware Checksum Fault" | Permanent |
| 13 | "Calibration Invalid" | Semi-Permanent, after the calibration settings are set correctly, the EVSE can enter a Non-Fault State |
| 14 | "System Clock Fault" | Permanent |
| 16 | "Pilot Frequency Out of Tolerance" | Temporary |
| 17 | "System Resources Unavailable" | Temporary |
| 18 | "Excessive Noise on Pilot Signal" | Temporary |
| 19 | "Low Line Voltage" | Temporary |
| 20 | "Watchdog Timer Expired" | Permanent |

Lockout faults are shown in Table 2:

TABLE 2

| Fault No. | Lockout Fault |
|---|---|
| 0 | "No Fault" |
| 1 | "Pilot Error During Idle" |
| 2 | "Pilot Error During Run" |
| 3 | "Ground Fault Detected" |
| 4 | "Overcurrent Detected" |
| 5 | "Break Away Occurred" |
| 6 | "Temporary Fault Lockout Occurred (Reset with Plug Session Cycle)" |
| 7 | "Ground Impedance Fault (not used)" |
| 8 | "Contactor Fault" |
| 9 | "Ground Fault Test Failure" |
| 10 | "Diode Fault" |
| 11 | "Master Fault Count Exceeded (Reset Required)" |
| 12 | "Firmware Checksum Fault" |
| 13 | "Calibration Invalid" |
| 14 | "System Clock Fault" |
| 16 | "Pilot Frequency Out of Tolerance" |
| 17 | "System Resources Unavailable" |
| 18 | "Excessive Noise on Pilot Signal" |
| 19 | "Low Line Voltage" |

EVSE states are shown in Table 3:

TABLE 3

| State No. | EVSE State |
|---|---|
| 0 | "Power-Up Initialization" |
| 1 | "Idle (Not Connected to EV)" |
| 2 | "EVSE in Test Mode" |
| 3 | "EVSE in Demo Mode" |
| 4 | "Permissive Run Disabled" (External Hardware Input or Software Control of EVSE to disable Plug Sessions from occurring; provides Binary On/Off control |
| 5 | "Service Required" (this Permanent Fault requires reset or repair) |
| 6 | "Temporary Fault Condition" (Lockout or Temporary fault) |
| 7 | "EVSE Charging" |
| 8 | "EV Connected - Not Charging" |
| 9 | "EV Connected - ALC Charging Disabled" (external hardware input or software control of EVSE which has Available Line Current set to 0) |
| 27 | "EVSE Deactivated" (external software control of EVSE to deactivate it and take it out of service) |
| 28 | "Pulse Activation Mode Idle" (similar to Permissive Run Disabled but uses hardware pulses or a software timer to activate the EVSE for a predetermined period of time) |

TABLE 3-continued

| State No. | EVSE State |
|---|---|

Example 15

Figure 5:
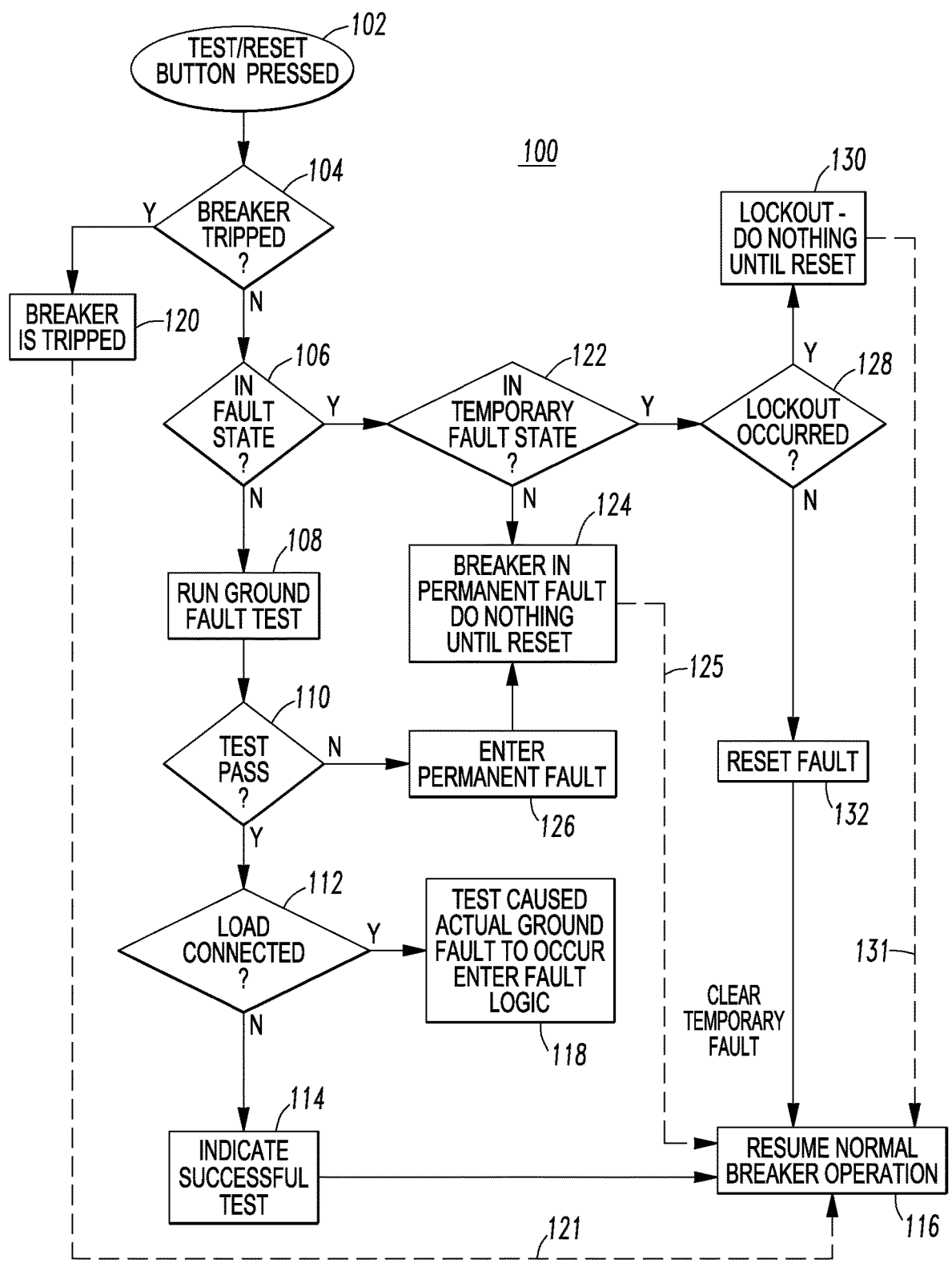
FIG. 5 is a flowchart of a test/reset routine of the EV circuit breaker of FIGS. 4A-4B.
Figure 6:
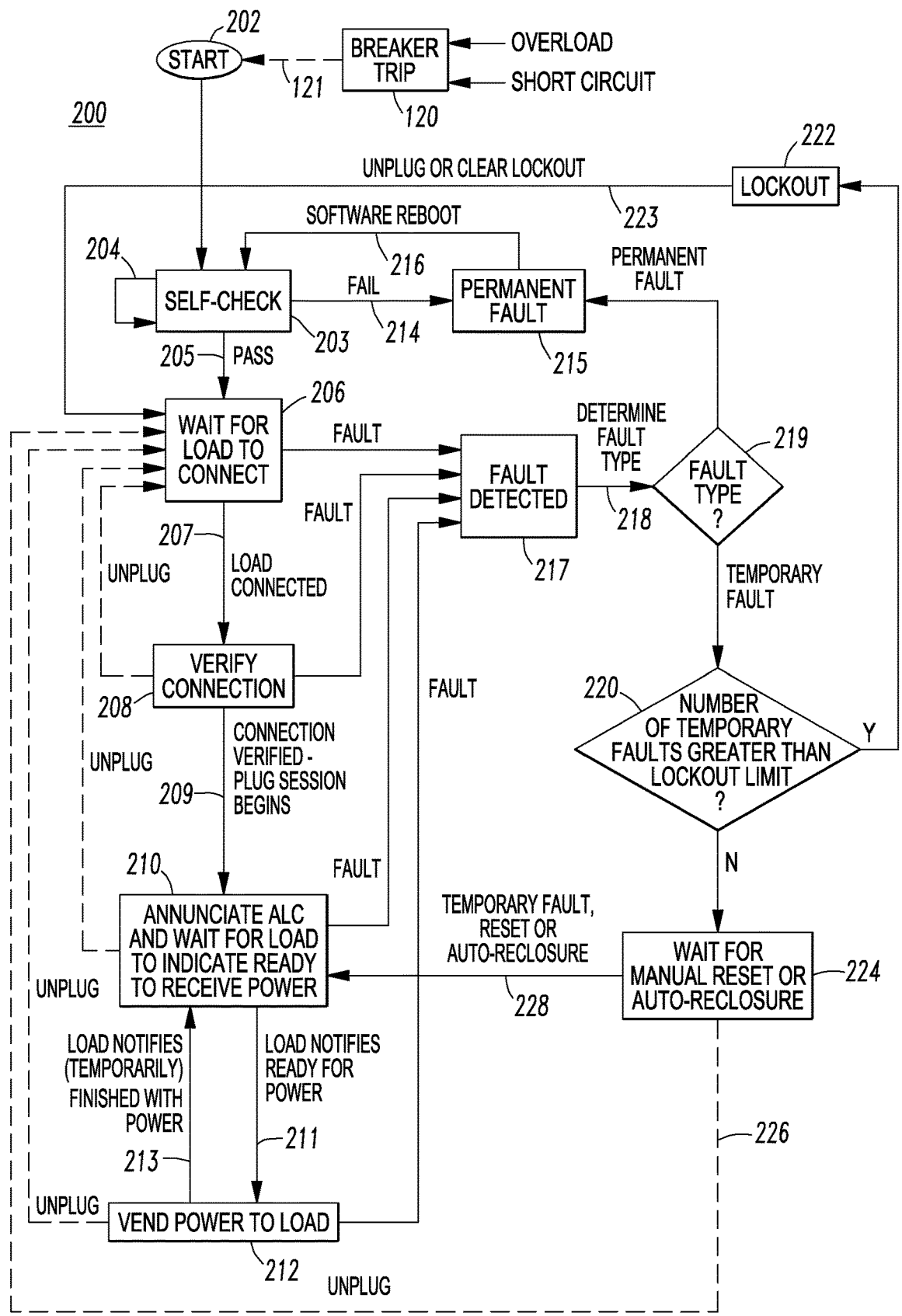
FIG. 6 is a flowchart of a top level routine of the EV circuit breaker of FIGS. 4A-4B.
Figure 9:
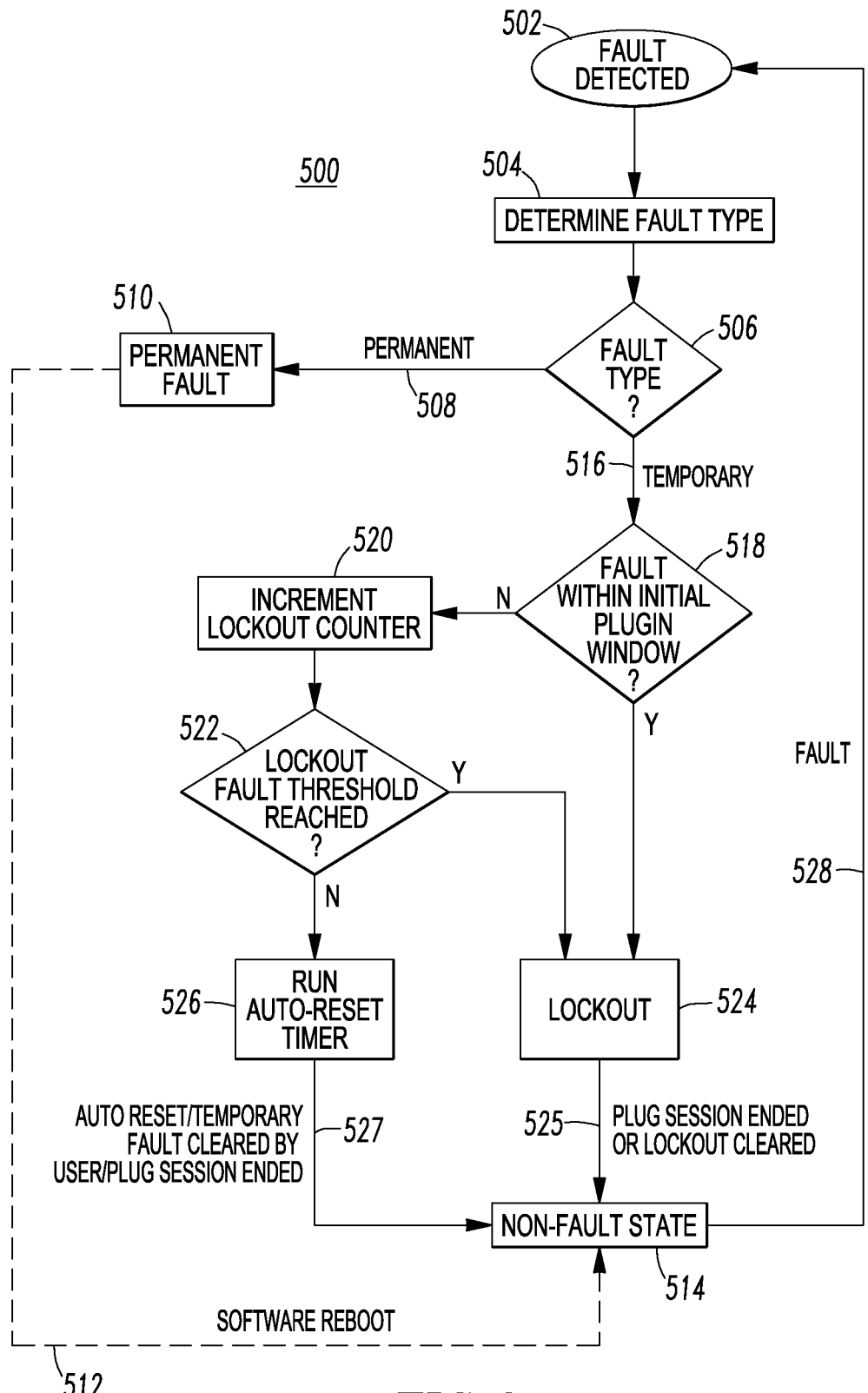
FIG. 9 is a flowchart of a fault and lockout logic routine of the EV circuit breaker of FIGS. 4A-4B.

FIG. 5 shows a test/reset routine 100 for the control electronics 68 of the circuit breaker 2' of FIGS. 4A-4B. The routine 100 begins at 102 in response to the test/reset button 46 being pressed. Next, at 104, it is determined if the circuit breaker 2' is tripped. If the circuit breaker is not tripped, then at 106, it is determined if there is a fault state. If there is no fault state, then at 108, a ground fault test is run along with any other suitable self-tests. If the ground fault test passes, then it is determined if a load is connected (i.e., the relay 44 is closed) at 112. If no load is connected, then a suitable indication is provided to the user (e.g., without limitation, indication light; LED; color; flag) that the test was successful at 114. Then, normal circuit breaker operation resumes at 116. Otherwise, if a load is connected, then at 118, the test caused an actual ground fault to occur and the fault routine 500 of FIG. 9 is executed. The reason that an actual ground fault occurs is because the fault detected state 217 of FIG. 6 is not suspended during the ground fault test. This state 217 will correctly detect ground current and cause a fault to occur. If the ground fault is not detected, then the test failed at 110 of FIG. 5, and the permanent fault is entered at 126 followed by 124.

On the other hand, if it is determined that the circuit breaker is tripped at 104, then the circuit breaker is tripped at 120 (e.g., in response to a short circuit or other overload condition as shown in FIG. 6). Normal circuit breaker operation is then resumed at 116 in response to a reset 121 of the circuit breaker handle 66 of FIG. 4A.

If it is determined that there is a fault state at 106, then it is determined if there is a temporary fault state at 122. If the fault state is not temporary, then there is a permanent fault at 124. Nothing is then done until there is a suitable reset (Example 14), which causes a reboot of the control electronics software at 125 after which normal circuit breaker operation is resumed at 116.

If it is determined that the test did not pass at 110, then the permanent fault is entered at 126 followed by 124.

If there is a temporary fault state at 122, then at 128 it is determined if a lockout occurred. If so, then a lockout state is entered at 130 and nothing is done until there is a suitable reset (Example 14). Normal circuit breaker operation is resumed at 116 in response to the end of a plug session or lockout is cleared at 131.

On the other hand, if no lockout occurred at 128, then the fault is reset at 132 followed by resuming normal circuit breaker operation at 116.

Example 16

FIG. 6 shows a top level routine 200 of the circuit breaker 2' of FIGS. 4A-4B, which can implement, for example and without limitation, SAE J1772™. The routine 200 starts at 202 in response to a power up condition. Then, self-checks are performed at 203 as part of a constantly running process 204. If the self-checks pass at 205, then the routine 200 waits for a load to connect at 206. When a load is connected at 207, then the connection is verified at 208. When the connection is verified, a plug session begins at 209. Next, the available line current (ALC) is annunciated and the routine 200 waits for the load to indicate that it is ready to receive power at 210. When the load notifies that it is ready for power at 211, the routine 200 causes the relay 44 to close and vend or otherwise make power available to the load at 212. Next, if the load notifies (temporarily) that it is finished with power, then the contactor/relay 44 is opened again at 210. The ALC never stops being annunciated, unless power is lost, a fault occurs, or the load is unplugged. Any of 208,210,212,222,224 can transition to 206 in response to the load being unplugged.

If the self-check 203 fails at 214, then a permanent fault is entered at 215. The self-check 203 can only be restarted by a power-up restart at 202, or by a software reboot at 216.

Also, any of 206,208,210,212 can transition to a fault detected state 217 in response to detection of a fault. The state 217 determines the fault type at 218. Then, at 219, it is determined the nature of the fault type. If the fault type is temporary, then at 220 it is determined if the number of temporary faults is greater than a lockout limit. If the lockout limit is reached, then the lockout state is entered at 222. From state 222, the load is either unplugged or the lockout is cleared at 223 to re-enter state 206 and wait for the load to connect. Otherwise, if the lockout limit was not exceeded at 220, then at state 224 a manual reset or an auto-reclosure is awaited. State 224 is exited at 226 if the load is unplugged after which state 206 is re-entered to wait for the load to connect, or at 228 in response to a temporary fault reset or auto-reclosure after which state 210 is re-entered to annunciate ALC.

The control electronics 68 of FIG. 4A include a watchdog timer (e.g., process 204) to open the contactor/relay 44 and reboot the software if it becomes unresponsive to provide additional simultaneous processes to monitor for faults, and to detect when a load is finished accepting power or unplugs. The control electronics 68 input the pilot signal 22 through a monitoring circuit 230, and adjust a PWM signal as part of the pilot signal 22 to the EV 4. The control electronics 68 also open and close the contactor/relay 44 to provide AC power (L1 and L2 or neutral). The EV charge controller 232 adjusts a charger 234 to only pull the ALC as annunciated over the pilot signal 22. The control electronics 68 also output to the indicators 40,42, and communicate through the communications interface 236.

Example 17

Figure 7:
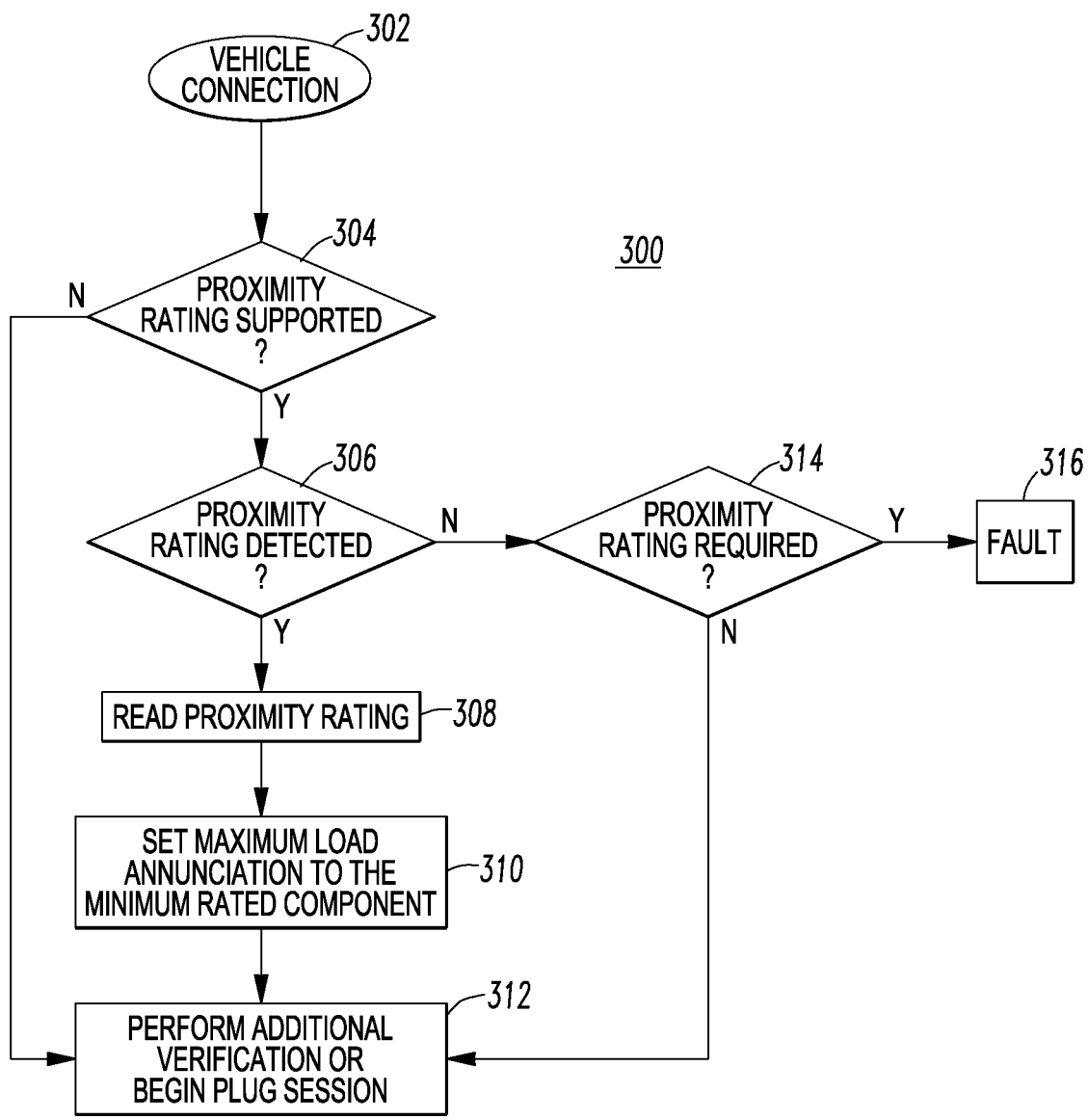
FIG. 7 is a flowchart of a proximity logic routine of the EV circuit breaker of FIGS. 4A-4B.

FIG. 7 shows a proximity logic routine 300 of the control electronics 68 of the circuit breaker 2' of FIGS. 2 and 4A-4B. In response to a connection to a vehicle being verified at 209 of FIG. 6, the vehicle connection is determined at 302. Next, it is determined if a proximity rating is supported at 304 by a configurable hardware or software setting. If so, then at 306, it is determined if a proximity rating is detected by determining if there is a closed circuit resistance from the proximity pin 30 to ground 16' of FIG. 4B. If so, then the proximity rating is read at 308 by determining the closed circuit resistance and matching this value with an ampacity in the standard. Then, at 310, the maximum load annunciation is set to the minimum rated component (e.g., as is discussed in Example 7). Next, at 312, additional load verification, such as detecting the EV diode or authenticating the user, is performed or a plug session is begun.

Otherwise, if a proximity rating is not supported at 304, then 312 is executed.

If a proximity rating is not detected at 306, then at 314, it is determined if a proximity rating is required. If so, then a fault state is entered at 316. Otherwise, 312 is executed.

Example 18

Figure 8:
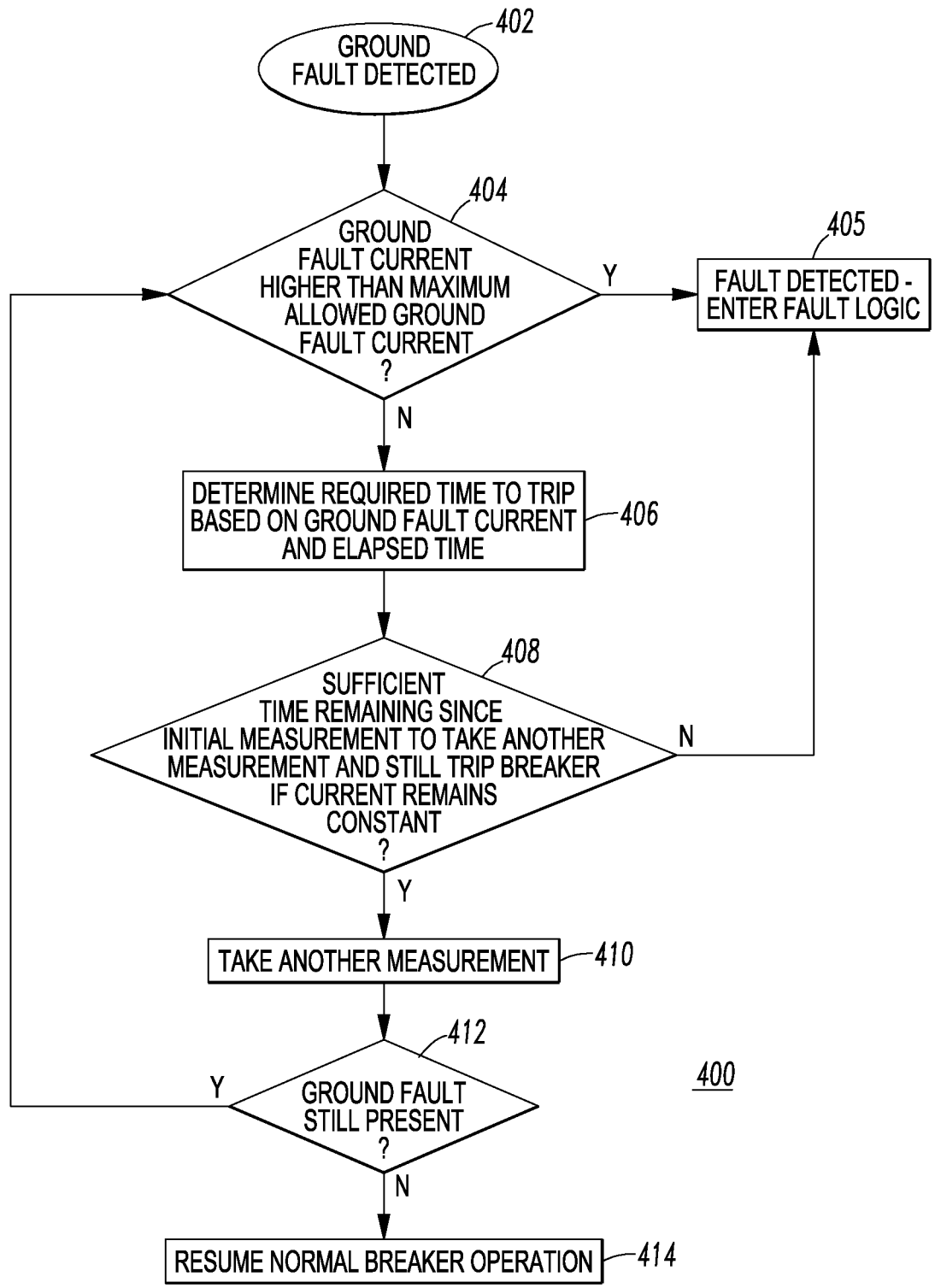
FIG. 8 is a flowchart of a ground fault detection routine of the EV circuit breaker of FIGS. 4A-4B.

FIG. 8 shows the ground fault detection routine 400. For example and without limitation, this implements the plot 402 of FIG. 10. The control electronics 68 of FIG. 4A include a ground fault current monitoring circuit (not shown) and the current transformer 64. These components have a known sampling rate, the contactor/relay 44 has a known period of time to open, and the routine 400 has a known time for processing and sending control signals.

After a ground fault is detected at 402, it is determined at 404 if the sensed ground fault current is higher than a maximum allowed ground fault current. If the ground fault current is larger than this value (e.g., without limitation, 350 mA), then a fault is detected at 405 and the fault routine 500 of FIG. 9 is executed. Ultimately, this will cause the relay 44 to open and cause a permanent fault at 215 of FIG. 6. For relatively high fault currents, there is no automatic reset, but there is instead a lockout fault that requires a plug session reset. Otherwise, if the maximum allowed ground fault current is not exceeded at 404, then at 406, the required time to trip based upon the ground fault current is determined along with the elapsed time. Generally, the way that variable ground fault tripping works is that if the ground fault monitoring circuit senses a relatively small current that is under the current-time plot 402 of FIG. 10, and if there is sufficient time to take another sample of ground fault current and still ultimately timely trip, then another sample is taken. Otherwise, if the current is too high and there is not enough time, then the ground fault trip is immediate.

Next, at 408, if there is sufficient time remaining since the initial measurement to take another measurement and still trip open the relay 44 if the ground fault current remains constant, then another measurement is taken at 410. On the other hand, if there is insufficient time at 408, then a fault is detected at 405 and the fault routine 500 of FIG. 9 is executed.

After 410, at 412, if the ground fault current read is zero, then there is no ground fault and normal circuit breaker operation is resumed at 414. Otherwise, if the current read is nonzero, then the average current with the elapsed amount of time is used to calculate the time remaining to trip and step 404 is repeated. The process continues until the ground fault monitoring circuit causes a trip after 405, or the ground fault current goes to zero and normal circuit breaker operation is resumed at 414.

Example 19

FIG. 9 shows the fault and lockout logic routine 500 of the control electronics 68 of the circuit breaker 2' of FIG. 4A. First, at 502, a fault is detected by the top level routine 200 of FIG. 6. Then, at 504, the fault type is determined. At 506, if the fault type is permanent 508, then at 510 a permanent fault state 510 is entered. This state 510 is exited in response to a software reboot 512, which causes a non-fault state 514 to be entered. Otherwise, if a temporary fault 516 is determined at 506, then at 518, it is determined if the fault was within an initial plug-in window (e.g., without limitation, an initial time period after the load is plugged in; a configurable amount of time; about one second; any suitable time). If the fault was not within the initial plug-in window, then a lockout counter is incremented at 520. Then, at 522, it is determined if a lockout fault threshold is reached. If so, then a lockout state is entered at 524. This state is exited by either a plug session ending or lockout being cleared at 525, after which the non-fault state 514 is entered. Otherwise, if the lockout fault threshold is not reached at 522, then an auto-reset timer is started at 526. This state exists until the auto-reset timer expires, a user clears a temporary fault, or the end of a plug session at 527, after which the non-fault state 514 is entered. The non-fault state 514 exits in response to a fault 528, which causes the fault detected state to be entered at 502.

Example 20

As will be discussed, below, in connection with FIGS. 11-13, a power vending machine (PVM) circuit breaker 600 can bill a user for energy consumed through the PVM circuit breaker. For example, a metering function 602 (FIG. 11) uses a logic circuit 604 (FIGS. 11 and 12) to store time-stamped energy values 606 in a persistent database 608 in memory 610. Both of the metering function 602 and the logic circuit 604 are within the housing of the PVM circuit breaker 600. The energy values 606, during certain timestamps, can be "flagged" as belonging to a number of specific users, which provides energy allocation to each of such number of specific users. For example, when the electric load 612 (shown in phantom line drawing), such as the EV 4 (FIG. 4B), is plugged in, the energy can be suitably allocated (e.g., without limitation, to the EV's vehicle identification number (VIN) or to an RFID tag swiped to allow charging, which will allocate the energy to the corresponding user; to any number of groups associated with the EV or the user). The circuit breaker 600 also allocates energy to its specific power circuit (e.g., to electric load 612 (shown in phantom line drawing in FIG. 11) at terminals 614,616).

When an electricity source, such as an electric utility 618 (shown in phantom line drawing in FIGS. 11 and 12), which supplies power to breaker stab 620 (e.g., from a hot line or bus bar (not shown)) and neutral pigtail 622 (e.g., to a neutral bar (not shown)) at a panelboard or load center (not shown), is ready to bill the user, it can do so in a variety of ways through communication done via an expansion port 624 (FIG. 12), or optionally through a built-in wireless interface (e.g., without limitation, Wi-Fi; BlueTooth). One example method is a "meter read" of the total energy at the time of the reading from a main circuit breaker (not shown, but which can be substantially the same as or similar to the circuit breaker 600, except having a relatively larger value of rated current) of a corresponding panelboard or load center (not shown). The value of the "meter read" is compared with the value of the "meter read" from, for example, the previous month's reading and the difference value is billed.

Alternatively, the electric utility 618 can download the database 608 of each circuit breaker, such as 600, in its entirety, query the energy values 606 as appropriate, and then apply a suitable rate structure using the timestamps, specific circuits, and any allocation flags.

Examples 21-23 (FIGS. 11-13) show the example controllable, PVM circuit breaker 600, which can include optional support for communications and/or a number of different add-on modules 626, as will be discussed.

Example 21

Figure 11:
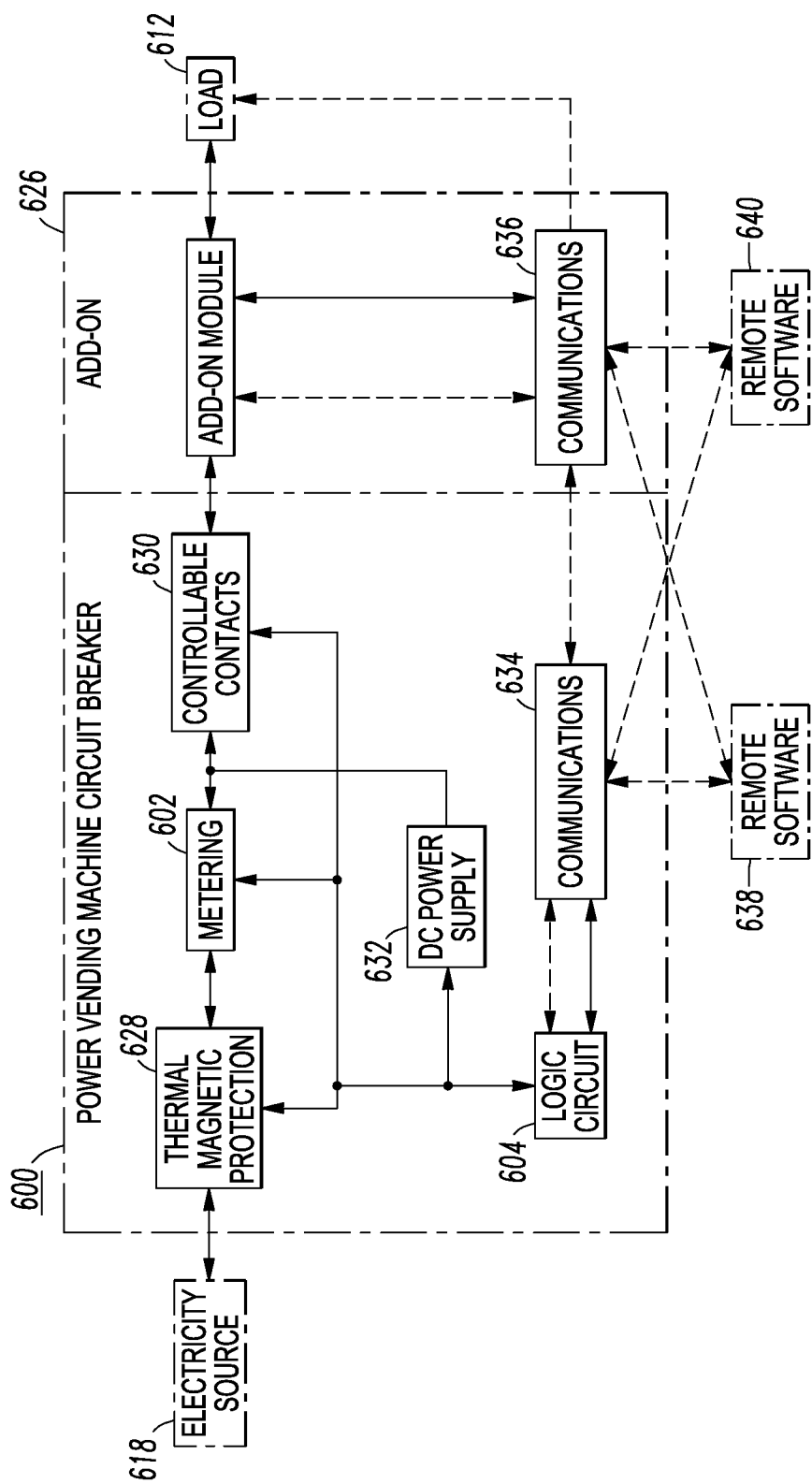
FIG. 11 is a simplified block diagram of a single-phase power vending machine (PVM) circuit breaker in accordance with another embodiment of the disclosed concept.

Referring to FIG. 11, the example PVM circuit breaker 600 can include a number of optional add-on modules 626. An alternating current (AC) electrical path through the PVM circuit breaker 600 between the electricity source 618 and the load 612 includes a thermal-magnetic protection function 628, the metering function 602 and controllable separable contacts 630. An AC-DC power supply 632 supplies DC power to, for example, the logic circuit 604 and a communications circuit 634. Alternatively, the DC power supply 632 can be located outside of the PVM circuit breaker 600 and supply DC power thereto. The number of optional add-on modules 626 can provide specific logic and/or I/O functions and a communications circuit 636. Optional remote software functions 638,640 can optionally communicate with the communications circuits 634,636.

Example 22

Figure 12:
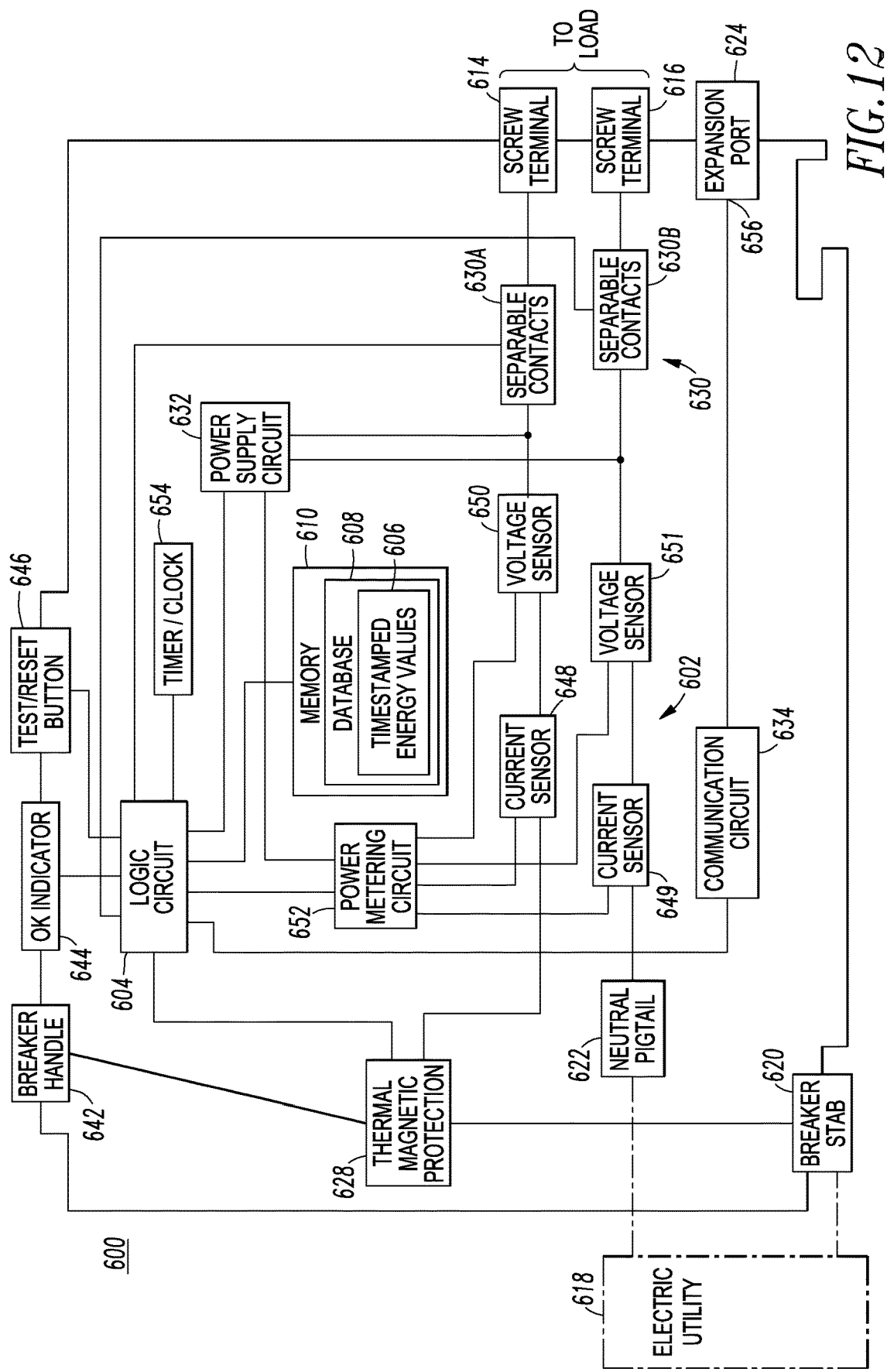
FIG. 12 is a relatively more detailed block diagram of the PVM circuit breaker of FIG. 11.

FIG. 12 shows more details of the example PVM circuit breaker 600, which includes an external circuit breaker handle 642 that cooperates with the thermal magnetic trip function 628 to open, close and/or reset corresponding separable contacts 629 (FIG. 13), an OK indicator 644 that is controlled by the logic circuit 604, and a test/reset button 646 that inputs to the logic circuit 604.

In this example, there is both a hot line and a neutral line through the PVM circuit breaker 600 along with corresponding current sensors 648,649, voltage sensors 650,651, and separable contacts 630A,630B for each line or power conductor. A power metering circuit 652 of the metering function 602 inputs from the current sensors 648,649 and the voltage sensors 650,651, and outputs corresponding power values to the logic circuit 604, which uses a timer/clock function 654 to provide the corresponding timestamped energy values 606 in the database 608 of the memory 610. The current sensors 648,649 can be electrically connected in series with the respective separable contacts 630A,630B, can be current transformers coupled to the power lines, or can be any suitable current sensing device. The voltage sensors 650,651 can be electrically connected to the respective power lines in series with the respective separable contacts 630A,630B, can be potential transformers, or can be any suitable voltage sensing device.

Example 23

Figure 13:
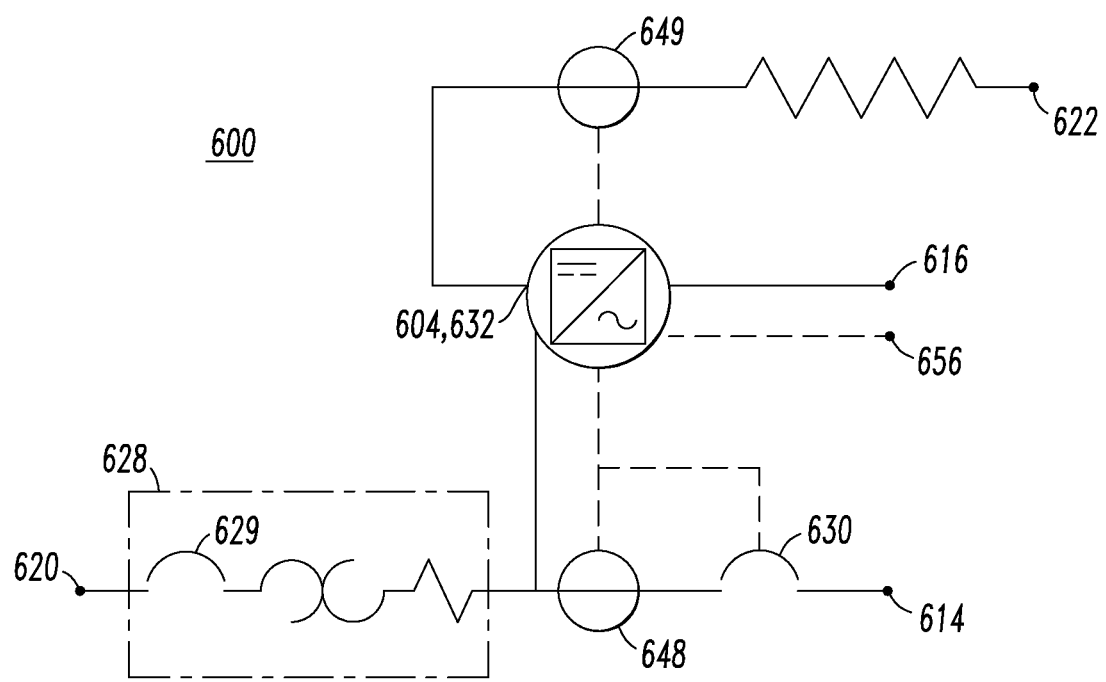
FIG. 13 is a further simplified block diagram of the PVM circuit breaker of FIG. 11.

FIG. 13 is an example one-line diagram of the example PVM circuit breaker 600. Although one phase (e.g., hot line and neutral) is shown, the disclosed concept is applicable to PVM circuit breakers having any number of phases or poles. A hot line is received through the termination 620 to a bus bar (not shown). Electrical current flows through the first circuit breaking element 629 of the thermal-magnetic overload protection function 628 and flows through a set of controllable separable contacts 630 (only one set is shown in this example for the hot line) to the load terminal 614. A first current transformer (CT) 648 provides current sensing and ground fault detection with customizable trip settings. The return current path from the load 612 (FIG. 11) is provided from the load terminal 616 for load neutral back to the neutral pigtail 622 for electrical connection, for example, to a neutral bar of a panelboard or load center (not shown). A second CT 649 provides current sensing and ground fault detection with customizable trip settings. The outputs of the CTs 648,649 are input by the logic circuit 604, which controls the controllable separable contacts 630. The power supply 632 receives power from the hot and neutral lines. The logic circuit communications circuit 634 also outputs to a communication termination point 656 of the expansion port 624 (FIG. 12).

Example 24

Figure 14:
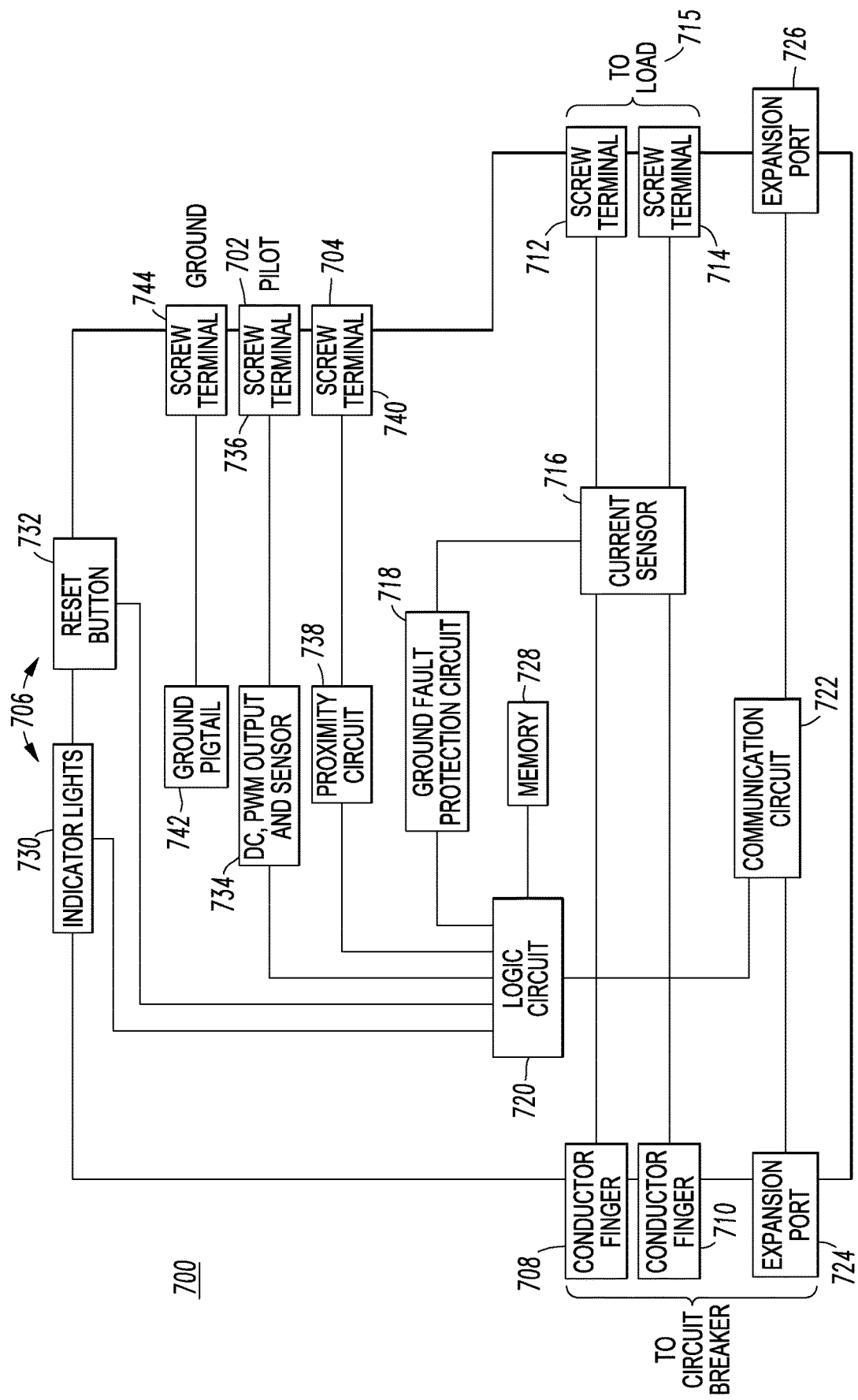
FIG. 14 is a relatively more detailed block diagram of the EV add-on module of FIG. 11.

FIG. 14 shows one example of the number of add-on modules 626 of FIG. 11, which can be an EV add-on module 700. The PVM circuit breaker 600 of FIGS. 11-13 and the EV add-on module 700 of FIG. 14 can function in the same or the substantially the same manner as the circuit breakers 2,2',2" described herein except that certain functionality is moved from the circuit breaker 600 to the module 700. The example module 700 adds a hardware and software implementation of a suitable EV communications protocol, ground fault detection at relatively low thresholds, and control of the controllable separable contacts 630 (FIG. 12). More specifically, the module 700 performs the functions of SAE J-1772™ (for NEMA markets) or IEC 62196 (where applicable) and provides the pilot signal 702 (and an optional proximity signal 704) outputs and inputs in addition to interfacing an external user interface 706. The module 700 controls the PVM circuit breaker 600 to perform proper power interlock and conform to the appropriate standards. It allocates metering information into a plug session history and can perform analytic functions (e.g., without limitation, use limitation based on energy; smart scheduling). The module 700 allocates the usage and billing, for example, to a VIN, which can be used to collect lost tax revenue from fuel purchases, enables throttling (e.g., controlling the rate of charge), and panel coordination (e.g., coordination with other controllable PVM circuit breakers to reduce or manage overall demand usage for the entire panel or utility service) in order to prevent demand charges.

The module 700 includes a first conductor finger 708 for a first hot line to the PVM circuit breaker 600, and a second conductor finger 710 for a second hot line or a neutral to such PVM circuit breaker. The conductor fingers 708,710 are electrically connected to respective terminals 712,714 for an electric load 715. These terminals are used to provide AC power into the EV connector (e.g., 32 of FIG. 4B). For a single-pole EV circuit breaker, these are a hot line and a neutral. For a two-pole EV circuit breaker, these are two hot lines. For a three-pole EV circuit breaker, these are three hot lines.

A number of current sensors 716 sense a differential current for a ground fault protection circuit 718, which can output a fault signal and other current information to a logic circuit 720. The logic circuit 720, in turn, can communicate externally through a communication circuit 722 to a first expansion port 724 (e.g., without limitation, to provide a trip signal to the PVM circuit breaker 600) and/or a second expansion port 726 to communicate with other local or remote devices (not shown). Details of the expansion ports 724,726 are discussed, below, in connection with FIG. 20.

The logic circuit 720 also communicates with a memory 728 and the external user interface 706, which can include a number of indicator lights 730 and a reset button 732. In support of various EV interface functions, the logic circuit 720 further communicates with a DC, PWM output and sensor function 734 that interfaces the pilot signal 702 at terminal 736 and an optional proximity circuit 738 that interfaces the optional proximity signal 704 (or proximity resistor (not shown)) at terminal 740 for an IEC style EV add-on module. The module 700 also includes a ground pigtail 742 that provides a ground to a ground terminal 744.

The example module 700 can be employed with the PVM circuit breaker 600 or any suitable circuit breaker disclosed herein that feeds a suitable electric load. Example protective functions performed by such circuit breakers can include overcurrent, ground fault, overvoltage, load interlock and/or a safe automatic reset. Example control functions include interfaces to the module 700, a suitable algorithm for the load (e.g., EV) and state management for the load (e.g., EV).

Example authentication functions performed by the module 700 include verification of permission to access power or control of the circuit breaker (i.e., vending power to a load), either locally or remotely, and additional logic and interlock settings. As an example, these include determining whether you are allowed to use power for the load (e.g., to charge an EV), or determining if you are an administrator allowed to control the circuit breakers.

Example allocation functions performed by the PVM circuit breaker 600 include tracking energy usage by department, circuit or user, limiting the amount of energy usage, and utility grade energy metering (e.g., 0.2% accuracy of metering).

Example optional and additional protection and control functions that can be enabled in the PVM circuit breaker 600 by the module 700 include interchangeable communication interfaces, remote control and additional trip curves.

Example 25

Figure 15:
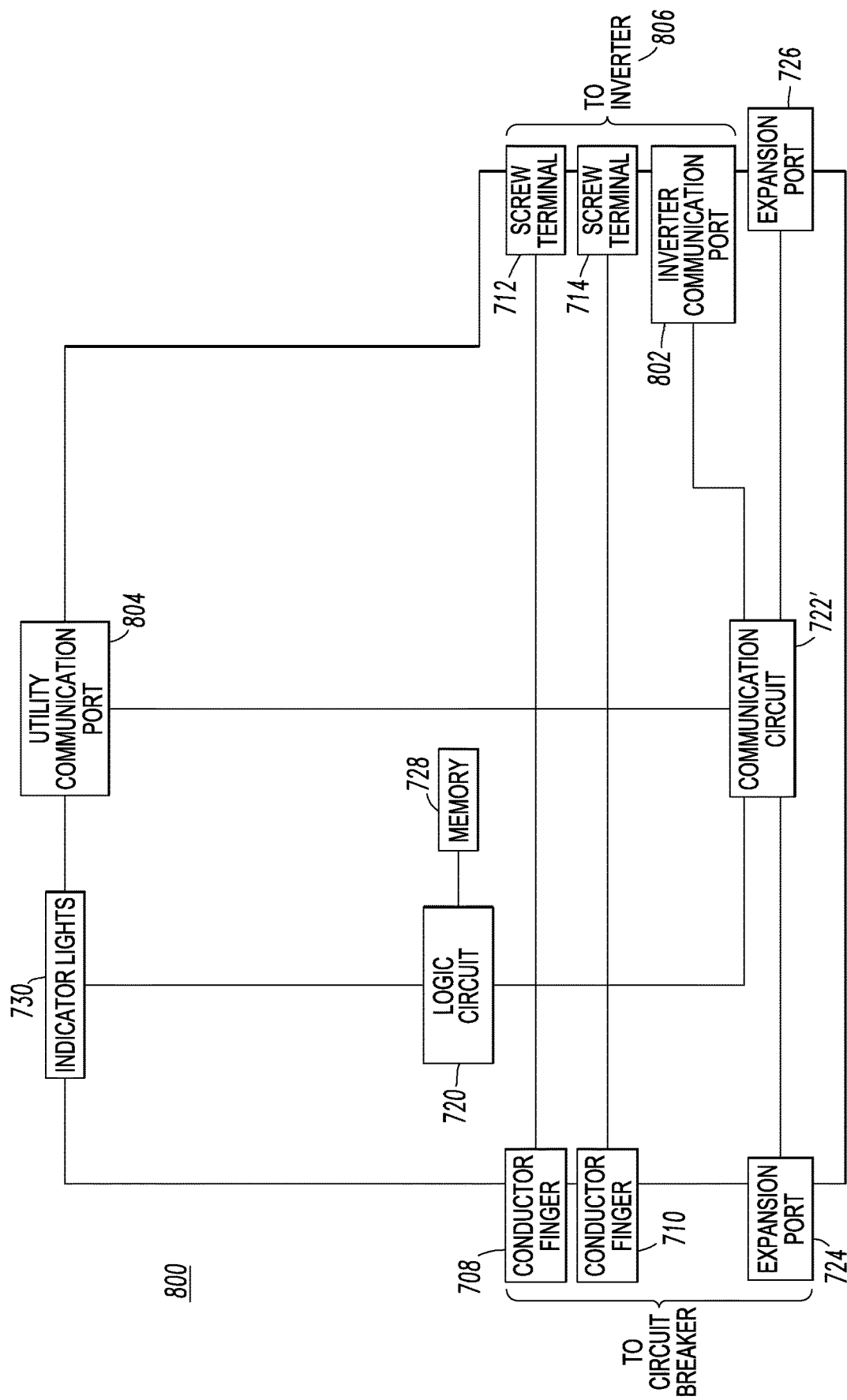
FIG. 15 is a block diagram of a solar or photovoltaic (PV) add-on module in accordance with another embodiment of the disclosed concept.

FIG. 15 shows a solar or photovoltaic (PV) add-on module 800 for a plug and play solar system (not shown), including needed functionality for a "PV-ready electrical circuit". The solar or PV add-on module 800 provides auto-commissioning and permitting for solar generation with self-diagnostics. The module 800 is somewhat similar to the module 700 of FIG. 14, except that the current sensor 716, ground fault protection circuit 718, reset button 732 and other EV-related components are eliminated. In this example, the terminals 712,714 are for electrical connection to an inverter 806, and the communication circuit 722' also interfaces to an inverter communication port 802 for communication with the inverter 806 and a utility communication port 804 for communication with an electric utility (e.g., electricity source 618 of FIG. 11).

The disclosed circuit breakers 2,2',2" and module 800 can provide a DC string protector (e.g., an electronic circuit breaker with improved DC overcurrent/reverse current protection, ground fault detection, and arc fault circuit interruption) and a PV module shutdown switches monitoring system, which monitors PV string current and voltage, along with a relatively small window I-V curve around maximum power for maximum power point tracking.

For a solar generation system (not shown), the disclosed module 800 enables a simple installation, with automatic electrical permitting and inspection to replace the need for electrical permits and inspections. A single electrical listing of the entire plug and play PV system is used to allow a standard PV plug to connect the PV inverter 806 to the add-on module 800 without additional permits or inspections, and with automatic structural permitting and inspection. The add-on module 800 includes a suitable communication interface, such as the inverter communication port 802, to notify the authority having jurisdiction (AHJ) of the solar installation and automatically commission and permit the installation without having an inspector visit the site to the extent possible. The add-on module 800 further includes a suitable communication interface, such as the utility communication port 804, to permit automatic grid interconnection by notifying the utility of the solar installation and automatically provisioning the installation to backfeed into the grid.

Other optional features of the add-on module 800 can include: (1) grid support communication functions (e.g., without limitation, status check/self diagnostics, which check the status of individual components of the inverter 806 and the corresponding PV modules (not shown) using artificial neural network based pattern recognition techniques; (2) self configuration/self-healing, in order that when there is a problem with components, the circuit breaker can still operate to provide power to the grid safely until the system is fixed (e.g., a limp home capability); (3) performance monitoring and lifetime estimation for performance monitoring of components for degradation, including notification for preemptive replacement; (4) volt/var support by the use of intelligent/smart/connected inverters (via the add-on module 800) to perform grid stability functions (this allows inverters to improve grid voltage or power factor); (5) utility power demand/frequency control (e.g., the utility might not want the PV inverter 806 connected or might need relatively lower power); (6) load as a resource by leveraging other loads in a PV module panel (not shown); and (7) GridEye™ or other suitable power quality monitors or sensors, which send the utility, frequency, voltage, and phase angle information as well as PV inverter power quality information. GridEye™ covers a wide-area grid monitoring network for the three North American power grids. This provides additional monitoring points at planned renewable generation sites—such as wind farms—to characterize the system's dynamic behavior before and after the installation of renewable sources. This produces dynamic system behavior data for insight into how renewable generation assets change the dynamic behavior of the electric grid. These data can also be used to estimate dynamic modeling parameters for planning and operation If used in a PV module panel (not shown), a different add-on module 800 can alternatively perform automatic transfer switch (ATS) functionality with utility islanding. For example, a software interlock of a main circuit breaker (not shown) and the generation system (not shown) would allow backfeeding if the utility power is present. Otherwise, when loss of utility power is detected, the add-on module 800 will: (1) command opening the main circuit breaker (not shown); (2) command closing the generation/energy storage circuit (not shown); and (3) send a signal to start the supply of power to the on premise generation source to able to supply power, such as a diesel generator. The load circuits are allowed to run in island mode in the premise. This safely electrically islands the premise to protect workers on the utility line while retaining power at the PV module equipped site. This ATS and islanding functionality could be a different add-on module 800 (for other energy sources that are not solar), but without PV-specific features.

Example 26

Further to Example 25, the example add-on module 800 enables relatively quick and easy installation of PV components, in order that the entire process may be conducted safely without the need of professional electrical services or on-site permitting. Pre-installed infrastructure (e.g., meters; load centers; circuit breakers; communication gateways) are enabled to support the future installation of PV components. After purchase, this PV equipment seamlessly connects to the existing infrastructure without the need for inspection. Pre-installation can be made for the anticipation to install any new smart grid-enabled equipment, including PV, as well as electric vehicle supply equipment (EVSE), local energy storage, smart water heaters, or other devices that can be justified on a broader smart-grid basis. This pre-installation approach can potentially be correlated with smart meter rollouts and utility-driven home energy management programs for retrofit upgrades or implanted into requirements for new construction. Furthermore, in order to accomplish these tasks, both internal connectivity and external connectivity to utility companies and AHJ's is critical to ensure safe installation, continued operations, and maintenance.

Example 27

Figure 16:
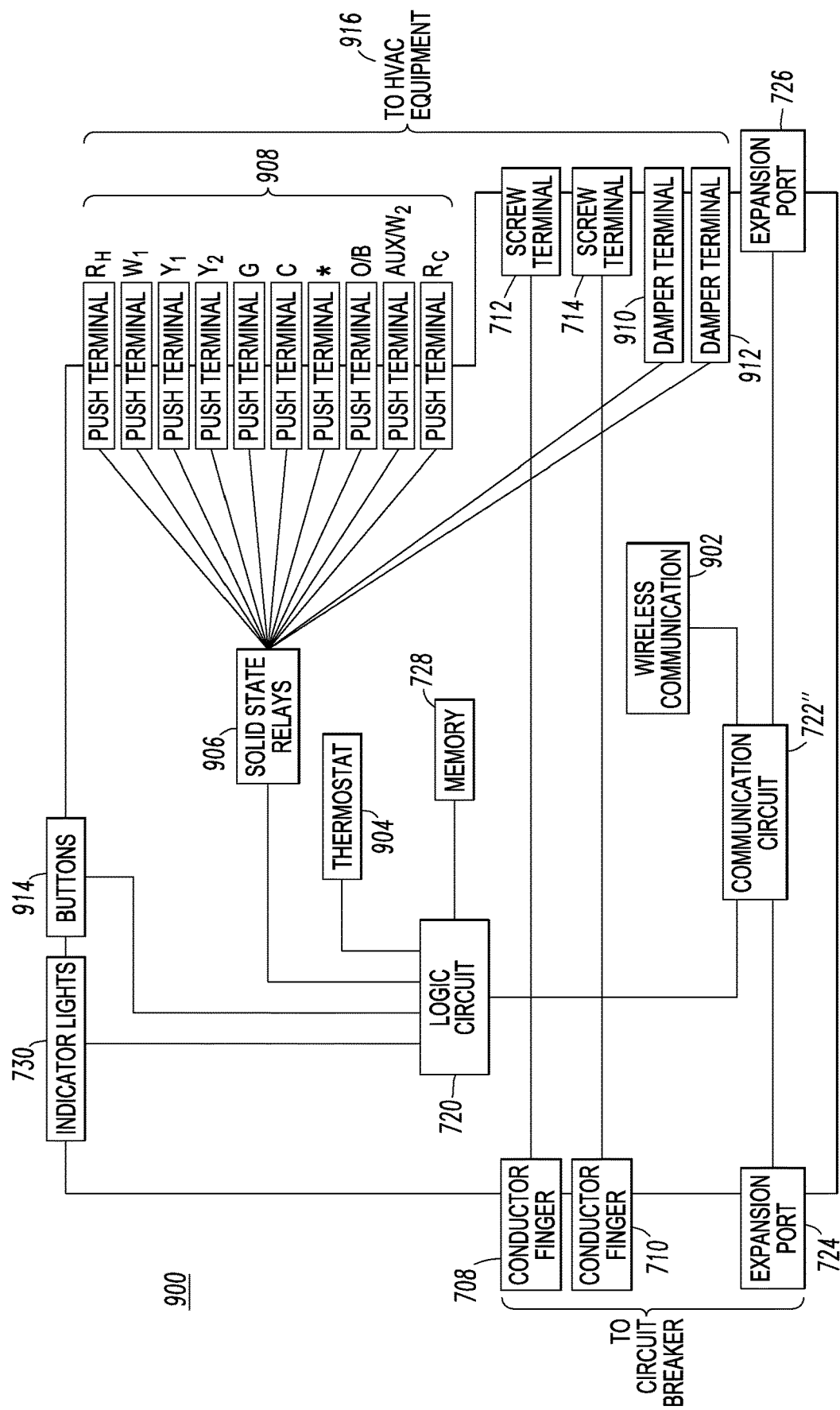
FIG. 16 is a block diagram of an HVAC add-on module in accordance with another embodiment of the disclosed concept.

FIG. 16 shows an HVAC add-on module 900. The module 900 is somewhat similar to the module 700 of FIG. 14, except that the current sensor 716, ground fault protection circuit 718, reset button 732 and other EV-related components are eliminated. In this example, the terminals 712,714 are for electrical connection to HVAC equipment 916, and the communication circuit 722" also interfaces to a wireless communication circuit 902. In place of the EV-related components, various HVAC-related components are added including a thermostat 904, a plurality of solid state relays 906 that output to a plurality of example push terminals 908 for HVAC signals such as: $R_H$, $W_1$, $Y_1$, $Y_2$, G, C, * (e.g., $W_3$ (third stage heating), E, HUM (humidify), DEHUM (dehumidify)), OB (orange or blue; orange is the reversing valve, energize to cool (changes from heat to cool on heat pumps); blue is sometimes the common side of a transformer (needed on some electronic thermostats or if there are indicator lamps), or a reversing value (energize to heat as orange), or some vendors sometimes use (B) as common), $R_c$ and AUX/$W_2$, as shown in Table 4A (legacy systems) and Table 4B (heat pumps and staged systems), respectively, as wells as damper terminals 910,912. The logic circuit 720 interfaces to a number of user interface buttons 914 and cooperates with the communication circuit 722", the thermostat 904 and the solid state relays 906 to control and monitor the HVAC equipment 916.

The example module 900 can replace a conventional thermostat and place all HVAC wiring in a load center (not shown). For a commercial building (not shown), this can include control (e.g., without limitation, of actuators; dampers). A number of communicating temperature sensors (not shown) can be located throughout the building to provide temperature input (e.g., through the expansion or wireless communication ports 726,902) to the HVAC add-on module 900 and can also be used to adjust temperature settings. The module 900 can also perform actions to save energy (e.g., without limitation, cycling a compressor; setting heating and cooling schedules).

TABLE 4A

| Terminal | Probable Wire Color | Signal | Description |
|---|---|---|---|
| C | Black | 24 Vac common | From one side of the 24 Vac transformer (24 Vac neutral) |
| R or V | Red | 24 Vac power to be switched | From other side of the 24 Vac transformer (24 Vac L1) |
| $R_H$ or 4 | Red | 24 Vac heat call switch power | Same as R, but dedicated to the heat call switch |
| $R_c$ | Red | 24 Vac cooling call switch power | Same as R, but dedicated to the cooling call switch |
| G | Green | Fan | Fan switch on thermostat-connected to R when fan/auto switch is in the fan |

TABLE 4A-continued

| Terminal | Probable Wire Color | Signal | Description |
|---|---|---|---|
| W or $W_1$ | White | Heating call | position Connected to R or $R_H$ when thermostat calls for heat (can be jumpered to Y on a heat pump; on others can be second stage heating) |
| Y or $Y_1$ | Yellow | Cooling call | Connected to R or $R_c$ when thermostat calls for cooling; also cooling or first stage heating on a heat pump; most often connected to G when fan switch is set to auto |

TABLE 4B

| Terminal | Probable Wire Color | Signal | Description |
|---|---|---|---|
| $Y_2$ | Blue or Orange | Second stage cooling | |
| $W_2$ or AUX | Varies | Second stage heating | First stage auxiliary heating on a heat pump |
| E | Varies, blue, pink, gray, tan | Emergency heat relay on a heat pump; active all the time when selected, usually not used | Disable the heat pump and turn on first stage Aux heating |
| O | Varies, orange | Reversing valve | Energize to cool (changes from heat to cool on heat pumps) |
| B | Varies, blue, black, brown, orange | Sometimes common side of transformer; needed on some electronic thermostats or if you have indicator lamps or reversing valve (energize to heat); some vendors sometimes use (B) as common | Can be heating changeover or common of transformer |
| X | Varies | | Can be common or sometimes emergency heat relay |
| $X_2$ | Varies | Second stage heating or indicator lights on some thermostats | Can be emergency heat relay |
| T | Varies, tan or gray | Outdoor anticipator reset | Used on some products |
| L | Varies | Service light | |

Example 28

Figure 17:
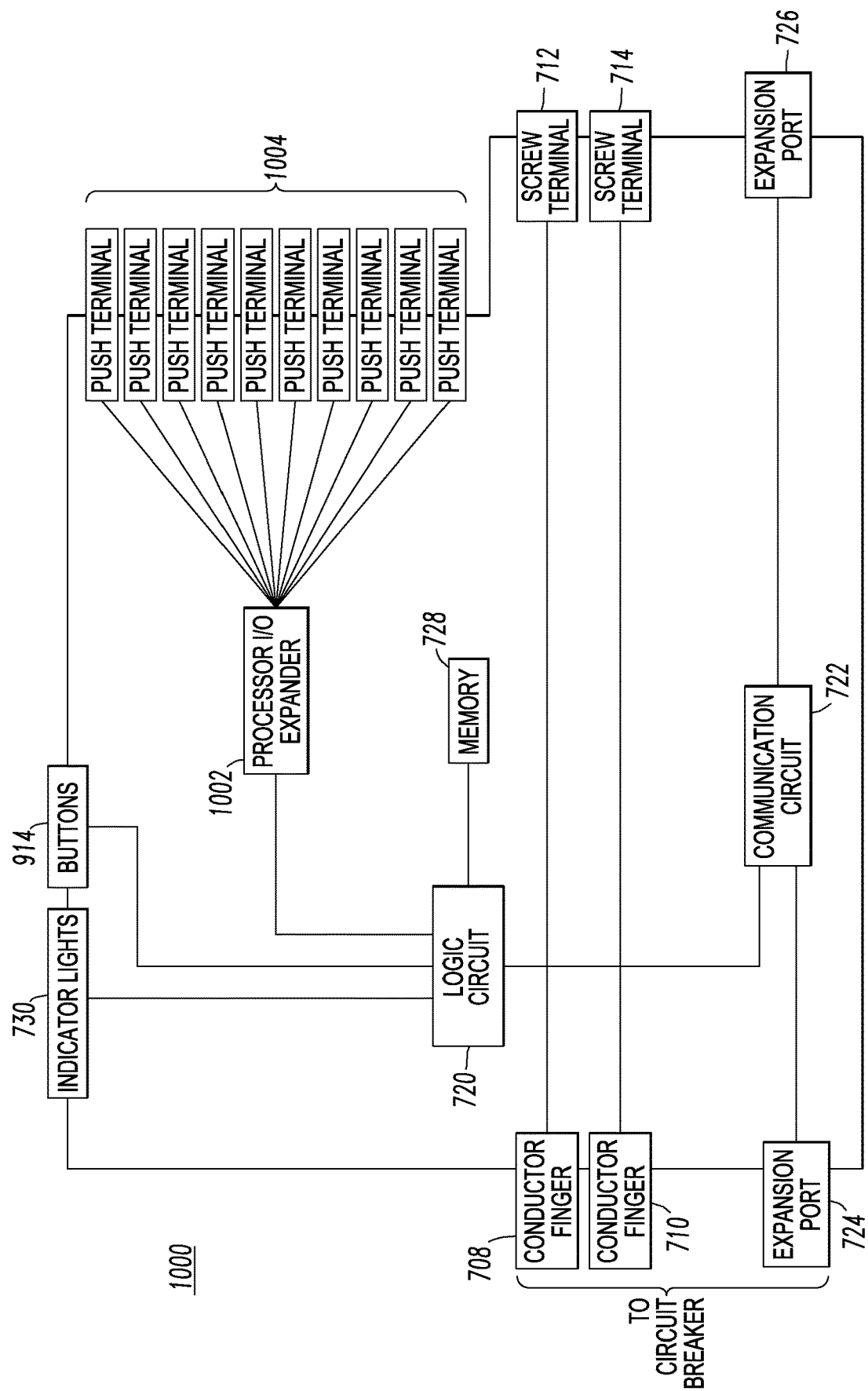
FIG. 17 is a block diagram of a general purpose input/output (I/O) add-on module in accordance with another embodiment of the disclosed concept.

FIG. 17 shows a general purpose I/O add-on module 1000. The module 1000 is somewhat similar to the module 900 of FIG. 16, except that the HVAC-related components and wireless communication circuit 902 are eliminated. In this example, the terminals 712,714 are for electrical connection to any suitable load (not shown), and the logic circuit 720 interfaces a processor I/O expander circuit 1002 that inputs from and/or outputs to a plurality of example push terminals 1004.

The module 1000 can provide analog inputs (e.g., for control signals), analog outputs, digital outputs (e.g., for external systems; relays; control signals) or digital inputs (e.g., for digital switches). The analog or digital inputs can be communicated through the example circuit breakers, such as 2,2',2",600, disclosed herein and can provide program control of such circuit breakers (e.g., without limitation, solar harvesting; digital switches; shunt trip; relay commands).

Further to Example 1, the add-on module 1000 can perform Boolean algebra and basic if-then-else functions with the logic circuit 720 using its inputs and outputs, and/or can be used as a binary status indicator (e.g., without limitation, to indicate that a main circuit breaker is open or closed) with the indicator lights 730.

The add-on module 1000 can employ the set of controllable, general purpose I/O terminals 1004 whose capabilities may include, for example and without limitation, direction (e.g., the terminals can be configured to be input or output using an enable mask); enabled/disabled; input values are readable (e.g., without limitation, high=1, low=0); output values are writable/readable; and input values can be used as interrupt request lines (e.g., without limitation, for wakeup events).

The add-on module 1000 can employ direct memory access (DMA) to efficiently move relatively large quantities of data into or out of the module, or provide support for "bitbanging", which can provide software emulation of a hardware protocol.

The example general purpose I/O add-on module 1000 can enable generic serial communication with a load (not shown). By providing a corresponding device, such as the example circuit breakers, with embedded intelligence and communication, this can provide an interface that connects that device to the "smart grid". Non-limiting examples of such communication include sending utility billing rates and time-of-use rate structures from the utility back office, through this add-on module 1000 and down to the load (e.g., without limitation, a washer; dryer; dishwasher), in order that the device can decide when the optimum time is to perform their function (e.g., to turn themselves on when energy is cheapest).

Examples 29 and 30 (FIGS. 18A-18C and 19) show various non-limiting example embodiments for coupling add-on modules to circuit breakers.

Example 29

Figure 18A:
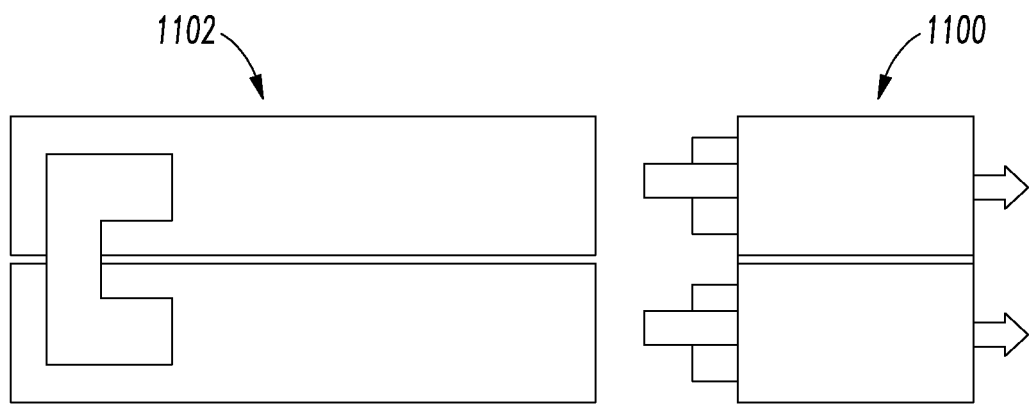
FIGS. 18A-18C are simplified plan views of circuit breakers and add-on modules in accordance with other embodiments of the disclosed concept.

FIG. 18A shows a two-pole add-on module 1100 coupled to one end of a two-pole circuit breaker 1102.

Figure 18B:
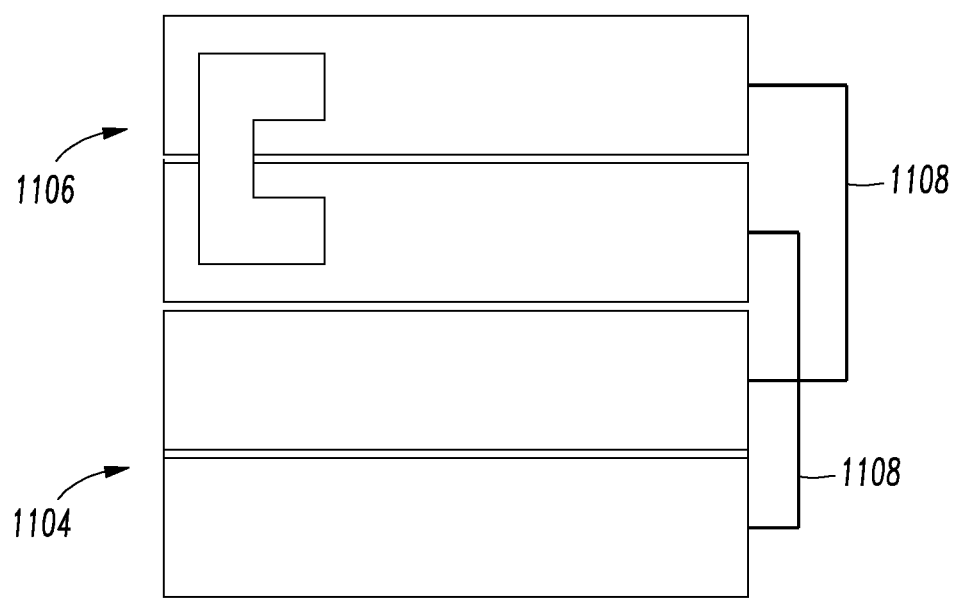

FIG. 18B shows a two-pole add-on module 1104 coupled to one side of a two-pole circuit breaker 1106 with jumpers 1108 therebetween.

Figure 18C:
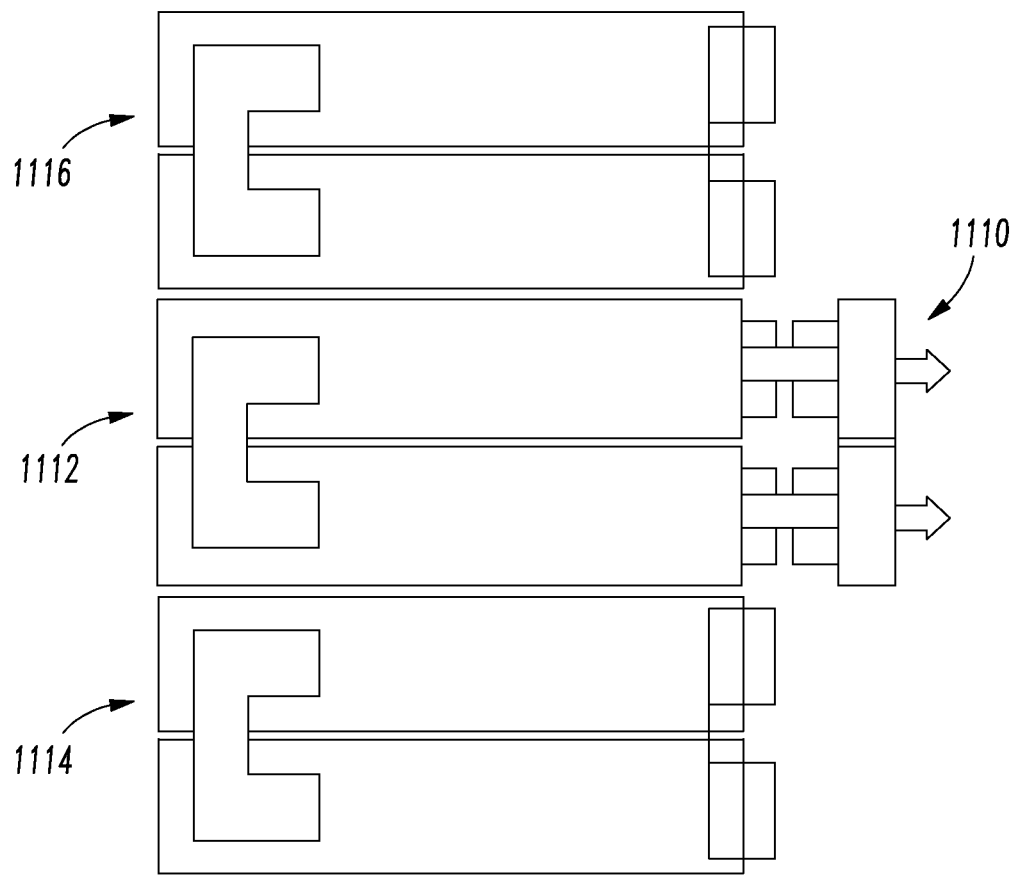

FIG. 18C shows a relatively small snap-on two-pole add-on module 1110 coupled to one end of a two-pole main circuit breaker 1112 or optionally to a separate local controller (not shown), which can optionally serve as an aggregator for other circuit breakers 1114,1116.

Example 30

Figure 19:
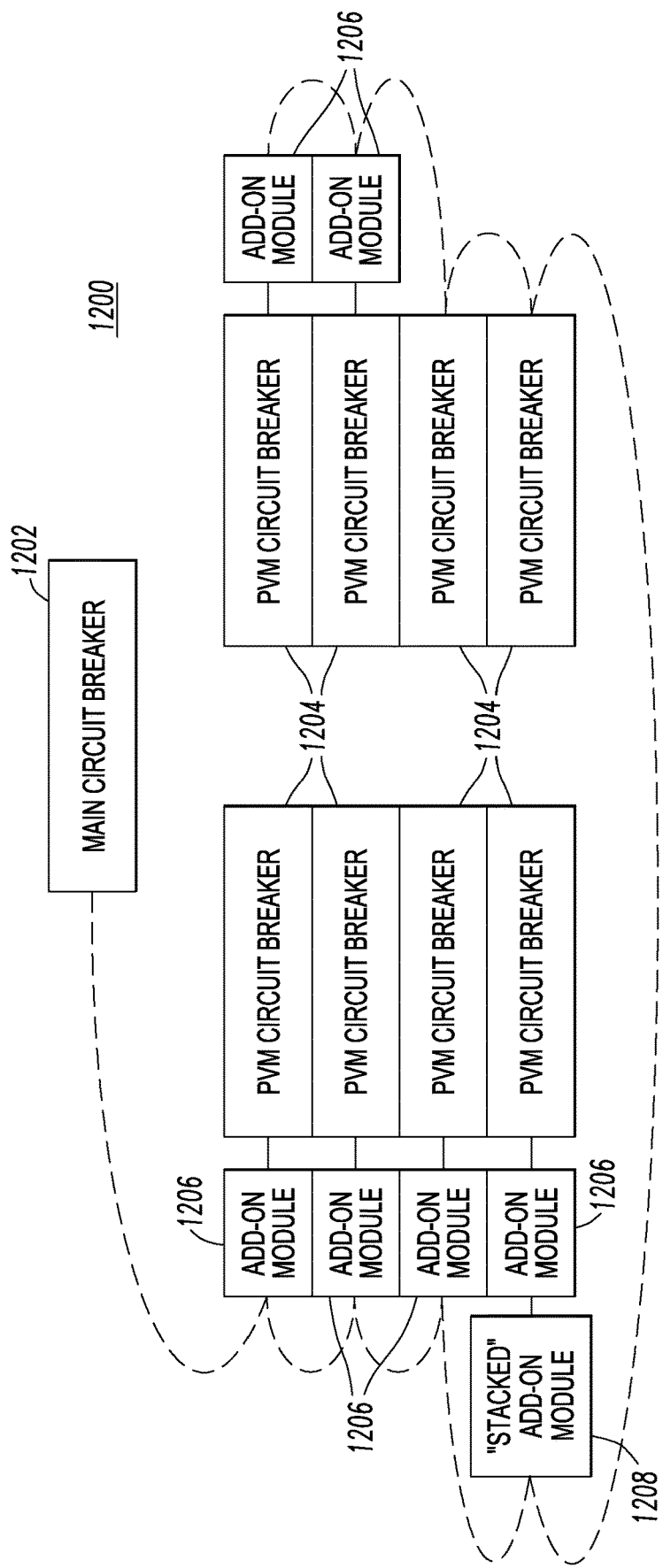
FIG. 19 is a block diagram of a PVM system including a main circuit breaker, which functions as or in conjunction with a local controller and gateway, and a plurality of PVM circuit breakers and add-on modules in accordance with another embodiment of the disclosed concept.

FIG. 19 shows a PVM system 1200 including a main circuit breaker 1202, which functions as or in conjunction with a local controller and/or gateway (not shown), and a plurality of PVM circuit breakers 1204. Six of eight of the example PVM circuit breakers 1204 include add-on modules 1206, and one of those six PVM circuit breakers 1206 includes a further "stacked" add-on module 1208. The "stacked" add-on module 1208 permits combining features of multiple add-on modules with different functionality onto the same circuit breaker, such as 1204, and its corresponding power circuit (not shown). For instance, an EV add-on module 1206 combined with an RFID authentication add-on module 1208 authenticates a user operatively associated with the EV to be charged before every charge session. For example, communication between the main circuit breaker 1202 and the PVM circuit breakers 1204 is through two of the PVM circuit breakers 1204, through five of the add-on modules 1206, and through the "stacked" add-on module 1208.

For example, multiple circuit breakers 1204 and/or add-on modules 1206,1208 are daisy-chained through expansion ports (e.g., 624 of FIG. 12, 726 of FIG. 14) to a controller 1202 for a panel or enclosure (not shown), such that the controller acts as a gateway, central repository for data, proxy device for a larger network, and/or a local stand-alone controller. Each device's expansion port can be coupled together in a daisy-chained fashion onto a common serial bus using a suitable communication protocol (e.g., without limitation, Modbus® over RS-485; Eaton® SMARTWIRE-DT™). One device can act as a "master" while all other devices are individually addressable slaves. The master device can have its own controller logic and/or an additional communication interface to act as a gateway onto another communication protocol.

Example 31

Figure 20:
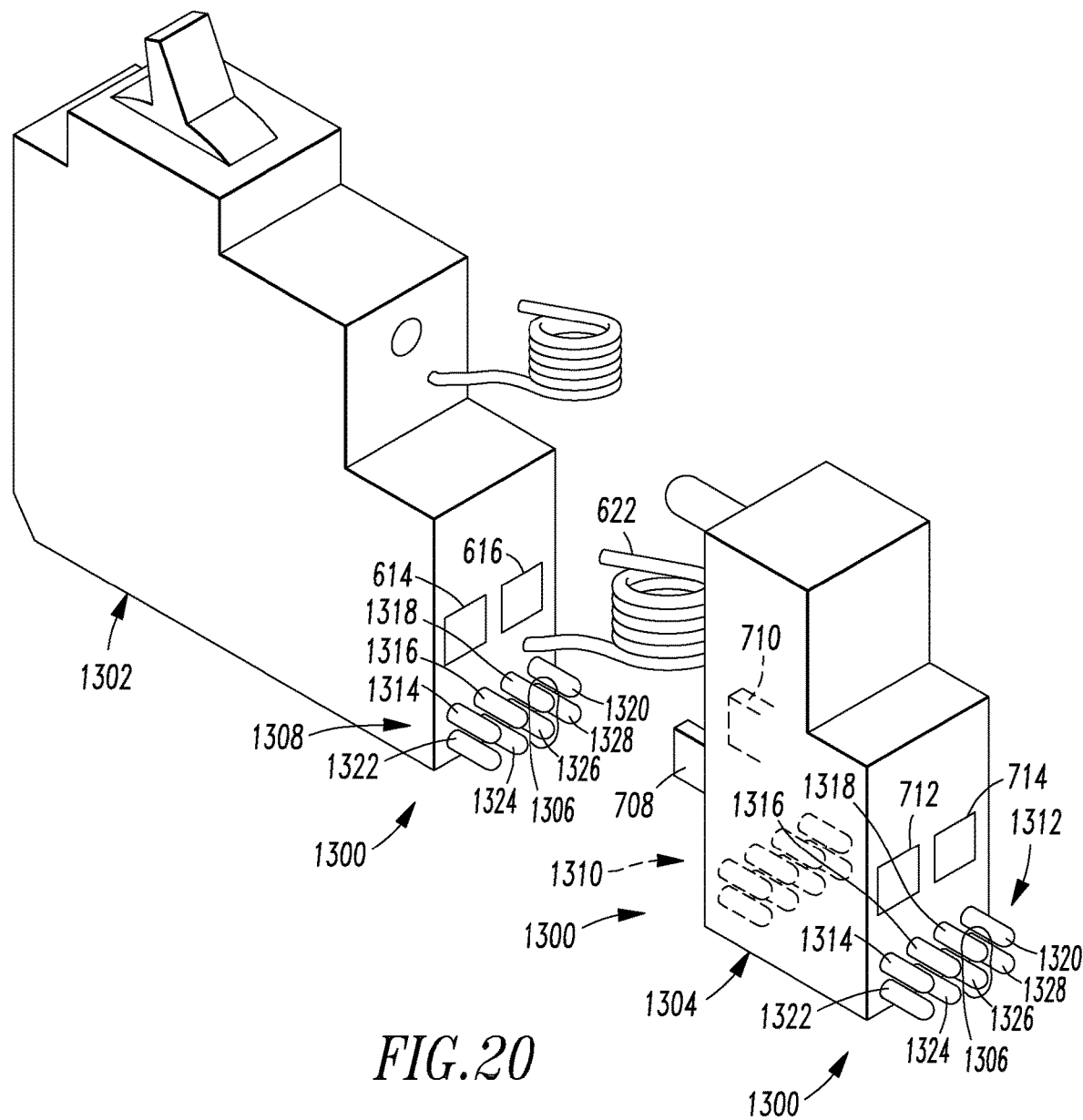
FIG. 20 is an exploded isometric view of a circuit breaker and add-on module in accordance with another embodiment of the disclosed concept.

FIG. 20 shows an example of expansion port electrical connections 1300, which electrically connect a circuit breaker 1302 to an add-on module 1304 using a suitable serial interface 1306. The electrical connections 1300 include expansion port pins 1308 at one end of the circuit breaker 1302, expansion port receptacles 1310 at one end of the add-on module 1304, and expansion port pins 1312 at the opposite end of the add-on module 1304. The disclosed expansion port includes eight example conductors: signal ground 1314, neutral 1316, COMM+ 1318, CONTROL PWR+ 1320, status 1322, contact control 1324, COMM− 1326, and CONTROL PWR− 1328. Status 1322 and contact control 1324 respectively report the status of and control the separable contacts (not shown, but see the controllable contacts 630 of PVM circuit breaker 600 of FIG. 11) of the circuit breaker 1302. These signals 1322,1324 are referenced to signal ground 1314. COMM+ 1318 and COMM− 1326 either provide communications between the circuit breaker 1302 and the add-on module 1304, or route the COMM+ 1318 and COMM− 1326 signals of the circuit breaker 1302 through the add-on module 1304. CONTROL PWR+ 1320 and CONTROL PWR− 1328 provide power from the circuit breaker 1302 to the add-on module 1304.

The example serial port provided by COMM+ 1318 and COMM− 1326 exchanges on/off control, provides an interface for external and/or remote communication, reports status information (e.g., without limitation, on/off/tripped; fault reason; fault time; time until reset; number of operations; serial number; clock; firmware version; time/clock), and reports metering values (e.g., without limitation, time-stamped values; voltage; current; power consumed by the load; power generated and fed into the panel). The time-stamped values can include net energy (watt-hours) (e.g., broken down by real, active, and reactive types, where each type contains forward, reverse, net, and total); and peak demand (watts) (e.g., calculated within a configurable time window size and reset at configurable time intervals). The example serial port includes a suitable serial bus in order to pass communications between multiple circuit breakers and add-on modules as was discussed above in connection with FIG. 19.

The expansion port controls the controllable separable contacts 630 of the PVM circuit breaker 600 (FIG. 12), reports the state of such separable contacts, and can be used to provide power to the embedded electronics from an external power source.

The power prongs or stabs (e.g., 708,710 of FIG. 14) fit into the termination points (e.g., 614,616 of FIG. 12) of the circuit breaker 1302 in order to provide power signals to the add-on module 1304. The add-on module 1304 has corresponding termination points 712,714 (FIG. 14) on the other side for the electric load (not shown) or for additional "stacked" add-on modules (e.g., 1208 of FIG. 19) that may be added.

The add-on module expansion port receptacles 1310 have the same communication format as the expansion port pins 1312, but are the opposite gender for mating with the circuit breaker expansion port pins 1308.

Example 32

Figure 21:
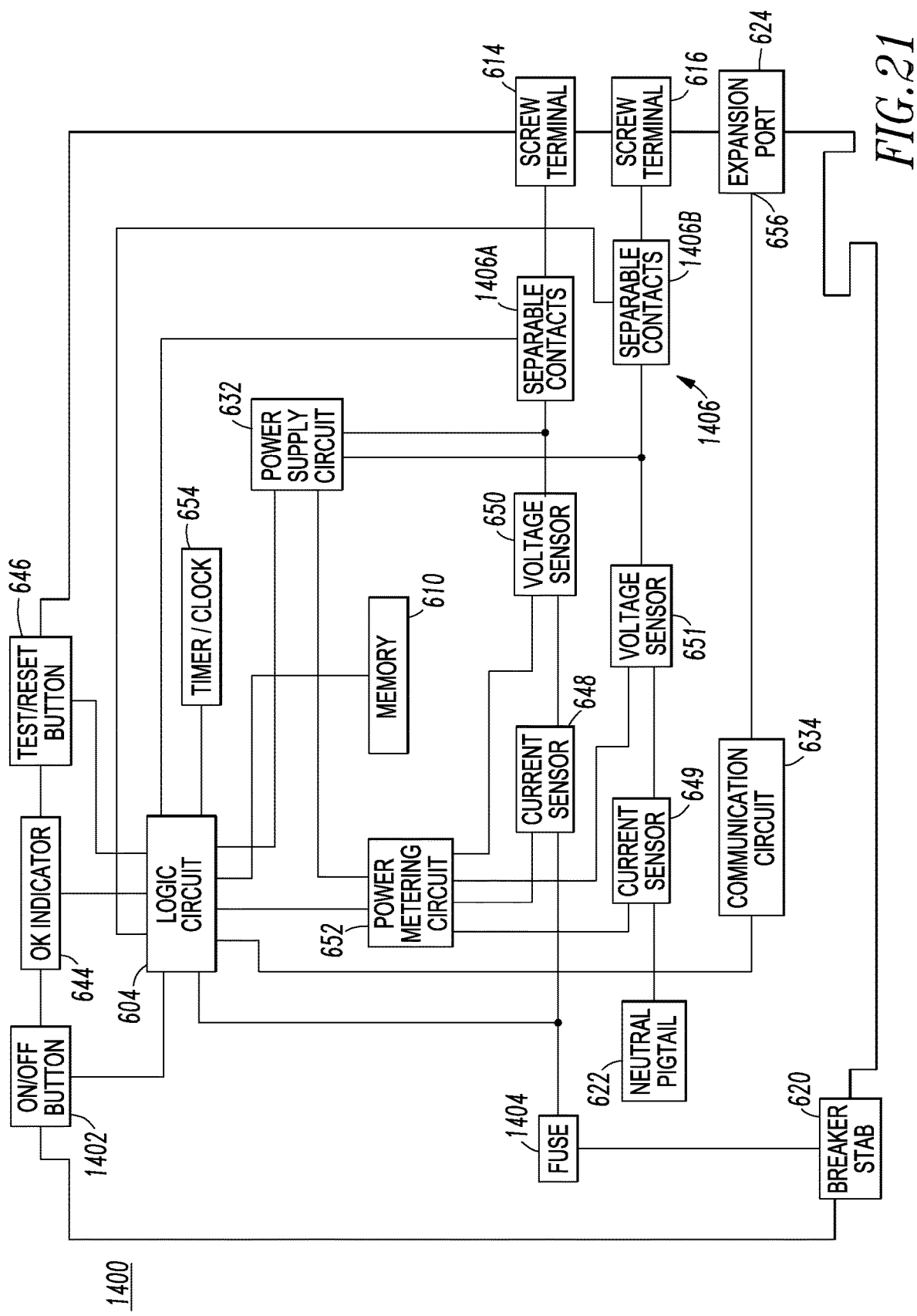
FIG. 21 is a block diagram of a PVM circuit breaker including a single set of separable contacts per power conductor and a fuse in accordance with another embodiment of the disclosed concept.
Figure 22:
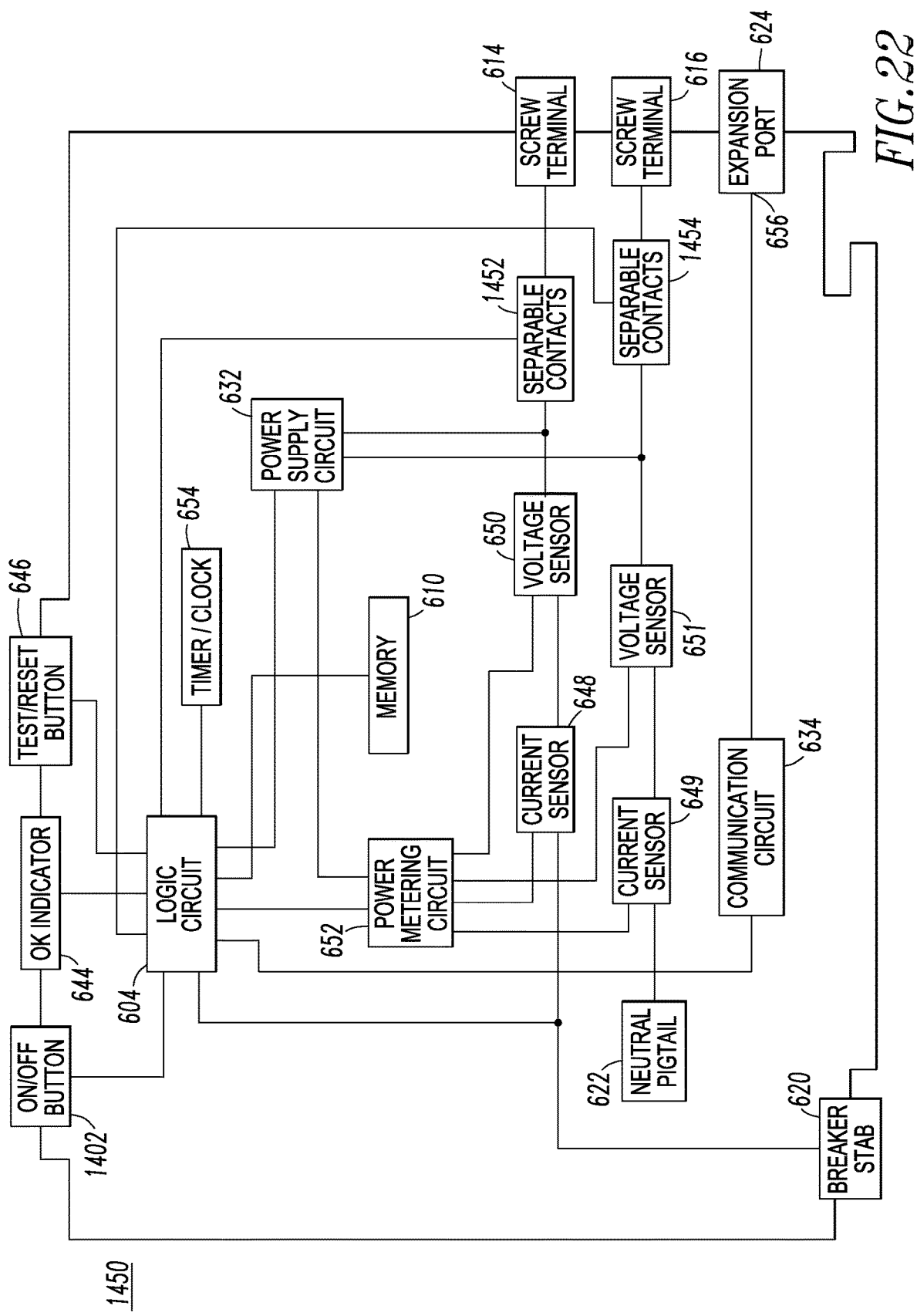
FIG. 22 is a block diagram of a PVM circuit breaker including a single set of separable contacts per power conductor in accordance with another embodiment of the disclosed concept.

FIGS. 21 and 22 (Examples 33 and 34, respectively) show circuit breakers 1400 and 1450, respectively, which are similar to the PVM circuit breaker 600 of FIGS. 11-13. The main difference is that these circuit breakers 1400 and 1450 include a single set of separable contacts 1406A,1406B or 1452,1454 per conductor (e.g., without limitation, hot line; neutral). The separable contacts 1406 are controlled for the purpose of on/off control and optionally for ground fault protection using the add-on module 700 of FIG. 14 or the logic circuit 604. However, thermal-magnetic protection through another set of separable contacts is not provided.

In contrast to Example 3, the thermal-magnetic protection is, instead, implemented, for example and without limitation, in control electronics firmware of the logic circuit 604, somewhat similar to how the ground fault protection is provided thereby.

For example, the single sets of separable contacts 1406A, 1406B can each be solid-state, with all protective and electric load (e.g., EV) functions being provided by a single electronic switching device.

The disclosed relay 44 of FIG. 4A is preferably small enough to fit inside the circuit breakers 1400,1450 and handle switching under load for current values under normal conditions (e.g., rated current). The relay 44, however, is not capable of opening, without damage, under fault conditions of ten times rated current. Hence, in that example, the example thermal-magnetic protection is employed in series with the second set of controllable separable contacts 24' of FIG. 4A.

Although separable contacts 24',1406A,1406B are disclosed, suitable solid state separable contacts can be employed. For example, the disclosed circuit breaker 2 includes a suitable circuit interrupter mechanism, such as the separable contacts 24' that are opened and closed by the operating mechanism of the relay 44, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

Example 33

In the PVM circuit breaker 1400 of FIG. 21, the circuit breaker handle 642 and the thermal-magnetic protection function 628 of FIG. 12 are replaced by an on/off button 1402 and a fuse 1404. Here, the separable contacts 1406 can be, for example and without limitation, the relay separable contacts 24' of FIG. 4A or, preferably, a suitable solid state switching device, which can handle switching under both normal and fault conditions.

In this example, the thermal-magnetic protection separable contacts (first circuit breaking element) 629 of FIG. 13 are eliminated. This allows for automatic-reset and remote control, even if an overcurrent or short circuit condition causes the fault. Additional short circuit protection is provided by the fuse 1404, which is electrically connected in series with the separable contacts 1406A in the hot line. Instead of the circuit breaker handle 642, the on/off button 1402 is input by the logic circuit 604, which controls the on or off state of the single sets of separable contacts 1406A, 1406B for each of the hot line and the neutral line, respectively.

If a resettable fuse 1404 is employed, then it would automatically reset after a fault was cleared. Otherwise, the fuse 1404 would blow and, therefore, need replacement after a fault current. The single set of separable contacts 1406 can be used at all other times.

Alternatively, software of the logic circuit 604 can emulate the fuse 1404 and trip the relay 44 (not shown, but see FIG. 4A) right before the fuse 1404 blows, if the fault can be detected fast enough.

Example 34

The circuit breaker 1450 of FIG. 22 is similar to the circuit breaker 1400 of FIG. 21, except that the fuse 1404 is not employed. Also, in this example, each of the sets of the separable contacts 1452,1454 is a suitable solid state switching device, which can handle switching under both normal and fault conditions.

Example 35

Since PVM circuit breakers, such as for example 600, 1400,1450, can include a wide range of features, various different add-on modules can be employed. For example, the EV add-on module 700 (FIG. 14) is coupled to the PVM circuit breaker 600 (FIGS. 11-13) with ground fault protection.

Examples 36-62 discuss a variety of different add-on modules, such as 626 of FIG. 11.

Example 36

An authentication add-on module performs user authentication using, for example and without limitation, RFID or the Internet. This can allocate usage of power into, for example, groups, power circuits, and users.

Example 37

A tenant billing software add-on module reads metering information from the PVM circuit breaker expansion port 624 and performs tenant metering/billing for a property owner. This function can be combined with the authentication add-on module (Example 36) (e.g., as shown with the add-on module 1206 and the "stacked" add-on module 1208 of FIG. 19) to charge individual users instead of individual branch circuits.

Example 38

A communications/protocol add-on module enables the PVM circuit breaker 600 to communicate using different protocols or languages to the electric utility, customer or end devices. This can include controlling the PVM circuit breaker 600 or displaying usage information, for example and without limitation, on a local webpage, through a cloud service, or on a suitable smart phone. Non-limiting communication examples include: Wi-Fi; cellular; Ethernet; serial; Smart Energy®; OpenADR™; BacNET™; Modbus®; power line carrier (PLC); SmartWire DT; IEC 61850; and DNP3.

Example 39

A schedule add-on module performs scheduling to turn on/off electric loads. This can be employed, for example and without limitation, to control exterior lighting with sunset/sunrise, cycle a pool pump to reduce energy usage, and have different and programmable holiday schedules.

Example 40

An analog/digital input add-on module allows analog or digital inputs to be communicated through PVM circuit breakers, such as 600, and program control thereof (e.g., without limitation, solar harvesting; digital switches; shunt trip).

Example 41

A programmable logic controller (PLC) add-on module implements PLC ladder logic for control and/or monitoring.

Example 42

A proprietary main circuit breaker add-on module provides all of the functionality of a corresponding proprietary main circuit breaker inside of the add-on module.

Example 43

A group control add-on module allows programming to control groups of circuit breakers instead of just one circuit breaker.

Example 44

A lighting add-on module provides scheduling and dimming functions. This can also provide alerts when the lights go out by detecting a corresponding drop in current.

Example 45

A power signature add-on module performs analysis of the voltage/current (V-I) curves for a known, dedicated load type and determines, notifies and/or trips for any failures that occur.

Example 46

A load ID add-on module identifies a specific load (e.g., down to the serial number) or load category (e.g., in terms of current rating or device type) when it is electrically connected. This module can employ, for example and without limitation, NFC/RFID (Near Field Communications/RFID) or power line carrier for identification purposes).

Example 47

A load annunciation and power interlock add-on module provides EV interfaces for EV applications.

Example 48

A surge protection add-on module provides surge protection for an individual circuit breaker, for a main circuit breaker, or for an entire circuit breaker panel.

Example 49

A battery management system add-on module controls an external inverter to properly charge batteries.

Example 50

A DC inverter/DC distribution system add-on module places an inverter and DC distribution system inside the circuit breaker panel to provide DC power from the load center. This could be used to charge electronics and power other DC devices.

Example 51

A data storage add-on module increases the storage capacity for a PVM circuit breaker. This can be employed, for example and without limitation, to store relatively larger amounts of metering data, keep a plug session history for the EV add-on module, or store relatively larger amounts of allocation to specific users.

Example 52

A power manager—load coordinator add-on module commands loads to operate in a coordinated fashion to minimize power/energy demand and ultimately cost based on time-of-use or real-time prices.

Example 53

A ground fault add-on module provides ground fault protection with adjustable ground fault current thresholds.

Example 54

An arc fault add-on module provides arc fault protection.

Example 55

A building automation controller add-on module permits a load center to perform building automation connectivity, management and programming.

Example 56

An HVAC controller add-on module controls and cycles a compressor (e.g., turns off the compressor, but leave the fan running), provides augmented learning techniques, and saves energy. For commercial buildings, it controls devices, such as actuators and dampers.

Example 57

A remote control add-on module controls a power circuit with a switch or a smart phone application. A simple variant is a dry contact to control the circuit breaker. A more advanced version is securely connected to the cloud to be controlled from any remote location.

Example 58

An advanced metering add-on module provides advanced metering functions (e.g., without limitation, harmonics; sags; swells; power factor; waveform capture for faults).

Example 59

An energy efficiency and analysis add-on module provides recommendations for how to save energy. This can include, for example and without limitation, reports on usage (e.g., down to branch circuits) combined with weather, solar output, and which circuits have phantom loads that could be turned off.

Example 60

A meter verification add-on module verifies an individual meter by taking a circuit breaker out of service, running known amounts of energy through the circuit breaker, and comparing the meter output. This can be performed on a schedule or on demand with the results reported back to the electric utility or other facility.

Example 61

An islanding main circuit breaker add-on module trips the main circuit breaker when power is lost from the electric utility (and closes it when it is reestablished) in order to safely allow a home with power generation capability to have electric power in a utility islanded mode. Otherwise, a serious safety issue can occur which could kill or seriously injure an outside utility worker by having electric power appear upstream where it normally should not be (e.g., during maintenance activities).

Example 62

A circuit breaker add-on module can provide circuit breaker control and monitoring through the circuit breaker expansion port 624 (FIG. 12). Also, additional logic can check the status (e.g., open; closed; tripped; indication of trip type, if available) of the circuit breaker and can override the controllable separable contacts 630. In some embodiments, the controllable separable contacts 630 can be externally controlled by the add-on module, which can: (1) vary trip curves; (2) vary interlock mechanisms/logic stored and commanded by the logic circuit 604; (3) vary protective functions and identify current and voltage signatures; (4) determine the "wellness" of the downstream electric load device; (5) report load health information through a communications port (e.g., 726 of FIGS. 14); and (6) open the controllable separable contacts 630 (FIG. 12) if the health reaches an unsatisfactory level.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker system for an electric load, said circuit breaker system comprising:
a power vending circuit breaker including:
a plurality of first terminals structured to electrically connect to a power source;
a plurality of termination points;
a first expansion port having a plurality of pins;
a number of separable contacts, at least one of said number of separable contacts being electrically connected between one of said first terminals and one of said termination points;
a thermal-magnetic protection circuit electrically connected in series with said at least one of said number of separable contacts between said one of said first terminals and said one of said termination points;
a metering circuit operatively associated with power flowing through at least one of said number of separable contacts;
a mechanism structured to open or close said number of separable contacts;
a first processor structured to cause said mechanism to open or close said number of separable contacts, to input a plurality of power values from said metering circuit and to determine a plurality of energy values; and
a communication mechanism cooperating with said first processor to communicate said energy values to the first expansion port;
an add-on module directly connected to the power vending circuit breaker and structured to expand functionality of the power vending circuit breaker, the add-on module including:
a plurality of stabs directly connected to the plurality of termination points and structured to receive power from the power source;
a second expansion port having a plurality of receptacles directly connected to the plurality of pins and structured to receive the plurality of energy values; and
a plurality of second terminals electrically connected to the plurality of stabs and structured to electrically connect to the electric load and provide power from the power source to the electric load,
wherein the circuit breaker system has a form factor of a miniature circuit breaker or a molded case circuit breaker.

2. The circuit breaker system of claim 1 wherein said electric load is an electric vehicle; and wherein said add-on module is an electric vehicle add-on module interfacing said electric vehicle, said electric vehicle add-on module being structured to communicate with said electric vehicle, detect a ground fault in a power circuit between said power vending circuit breaker and said electric vehicle, and control said number of sets of separable contacts through said first and second expansion ports.

3. The circuit breaker system of claim 2, wherein said electric vehicle add-on module further comprises:
a pilot signal terminal structured to electrically connect to the electric vehicle and to communicate or receive a pilot signal with the electric vehicle; and
a DC, PWM output and sensor circuit structured to generate and communicate the pilot signal to the pilot signal terminal and to receive and interpret the pilot signal from the pilot signal terminal.

4. The circuit breaker system of claim 2, wherein said electric vehicle add-on module is structured to allocate usage of power to an identifier associated with the electric vehicle.

5. The circuit breaker system of claim 2, wherein said electric vehicle add-on module further comprises:
an external user interface having a reset button and a number of indicator lights.

6. The circuit breaker system of claim 1, wherein said electric load is an inverter; and wherein said add-on module is a solar or photovoltaic add-on module interfacing said inverter.

7. The circuit breaker system of claim 6 wherein said solar or photovoltaic add-on module comprises a communication circuit structured to communicate with the power vending circuit breaker through the first and second expansion ports, with the inverter through an inverter communication port, and with an electric utility through a utility communication port.

8. The circuit breaker system of claim 6, wherein the solar or photovoltaic add-on module is structured to check a status of components of the inverter using artificial neural network based pattern recognition techniques.

9. The circuit breaker system of claim 6, wherein the solar or photovoltaic add-on module is structured to provide one or more of: (1) grid support communication functions; (2) self-configuration and self-healing; and (3) power quality monitoring.

10. The circuit breaker system of claim 1, wherein said electric load is HVAC equipment; and wherein said add-on module is an HVAC add-on module interfacing said HVAC equipment, said HVAC add-on module comprising a communication circuit interfaced to said second expansion port, a wireless communication circuit interfaced to said communication circuit, a thermostat, a plurality of solid state relays, a plurality of terminals for HVAC signals driven by said solid state relays, and a processor cooperating with said communication circuit, said thermostat and said solid state relays to control and monitor said HVAC equipment.

11. The circuit breaker system of claim 10, wherein said HVAC add-on module is structured to receive temperature input from one or more external temperature sensors.

12. The circuit breaker system of claim 10, wherein said HVAC add-on module is structured to set heating and cooling schedules.

13. The circuit breaker system of claim 1, wherein the add-on module is an input/output add-on module having a plurality of controllable general purpose input/output terminals and processor interfaced with the plurality of controllable general purpose input/output terminals, wherein the processor is structured to control at least one of direction, enable/disable, readability of input values, writability and readability of output values, and interrupt capabilities of the plurality of controllable general purpose input/output terminals.

14. The circuit breaker system of claim 1, wherein the power vending circuit breaker further comprises:

an external circuit breaker handle structured to cooperate with the thermal-magnetic protection circuit to open, close, and reset at least one of said number of separable contacts.

15. The circuit breaker system of claim 1, wherein the metering circuit is structured to provide utility grade metering with 0.2% accuracy.

\* \* \* \* \*